US012072501B1

(12) United States Patent
Morvan et al.

(10) Patent No.: US 12,072,501 B1
(45) Date of Patent: Aug. 27, 2024

(54) DECREASING SIZE OF USER INTERFACE ELEMENT IN DISPLAY OF HEAD-MOUNTED DEVICE

(71) Applicant: GOOGLE LLC, Mountain View, CA (US)

(72) Inventors: Stiven Guillaume Francois Morvan, New York, NY (US); Dongeek Shin, San Jose, CA (US); Konstantine Nicholas John Tsotsos, Corte Madera, CA (US); Li-Te Cheng, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/168,770

(22) Filed: Feb. 14, 2023

(51) Int. Cl.
*G09G 3/00* (2006.01)
*G02B 27/01* (2006.01)

(52) U.S. Cl.
CPC ..... *G02B 27/0172* (2013.01); *G02B 27/0179* (2013.01); *G02B 2027/0178* (2013.01)

(58) Field of Classification Search
CPC ............ G02B 27/0172; G02B 27/0179; G02B 2027/0178; G06F 3/012; G06F 3/0482; G09G 2340/04
See application file for complete search history.

(56) References Cited

U.S. PATENT DOCUMENTS

| 5,305,435 | A | * | 4/1994 | Bronson | G06F 3/0481 715/788 |
| 7,386,801 | B1 | * | 6/2008 | Horvitz | G06F 3/0481 715/767 |
| 8,643,951 | B1 | * | 2/2014 | Wheeler | G02B 27/017 359/630 |
| 10,649,526 | B1 | | 5/2020 | Braga Lourenço et al. | |
| 2002/0044152 | A1 | * | 4/2002 | Abbott, III | G02B 27/017 345/629 |

(Continued)

FOREIGN PATENT DOCUMENTS

| CN | 112732071 A | 4/2021 |
| WO | 2019043025 A1 | 3/2019 |

OTHER PUBLICATIONS

International Search Report and Written Opinion for PCT Application No. PCT/US2024/015586, mailed on May 2, 2024, 18 pages.

*Primary Examiner* — Adam J Snyder
(74) *Attorney, Agent, or Firm* — Brake Hughes Bellermann LLP

(57) ABSTRACT

A head-mounted device may present a first user interface element and a second user interface element within a user interface that is included in a display of the head-mounted device. The head-mounted device may, in response to movement of the head-mounted device, move the first user interface element and the second user interface element within the display, the movement of the first user interface element decreasing a boundary distance below a threshold distance, the boundary distance being based on a distance between the first user interface element and a boundary associated with the user interface. The head-mounted device may decrease a size of the first user interface element while the boundary distance is decreasing and is below the threshold distance.

18 Claims, 17 Drawing Sheets

(56) References Cited

U.S. PATENT DOCUMENTS

| | | | |
|---|---|---|---|
| 2012/0050141 A1* | 3/2012 | Border | G02B 27/017 345/8 |
| 2012/0050143 A1* | 3/2012 | Border | G02B 27/017 345/8 |
| 2012/0062444 A1* | 3/2012 | Cok | G02B 27/0172 345/8 |
| 2012/0121138 A1* | 5/2012 | Fedorovskaya | G02B 27/017 382/107 |
| 2013/0135353 A1* | 5/2013 | Wheeler | G02B 27/017 345/660 |
| 2013/0139082 A1* | 5/2013 | Wheeler | G02B 27/017 715/765 |
| 2013/0336629 A1* | 12/2013 | Mulholland | G02B 27/017 386/230 |
| 2014/0285435 A1 | 9/2014 | Bezos | |
| 2014/0320383 A1* | 10/2014 | Goto | G02B 27/017 345/8 |
| 2014/0347390 A1 | 11/2014 | Poulos et al. | |
| 2015/0213778 A1* | 7/2015 | Moravetz | G02B 27/017 345/520 |
| 2015/0325054 A1 | 11/2015 | Salter et al. | |
| 2016/0103483 A1 | 4/2016 | Raffle et al. | |
| 2016/0210784 A1 | 7/2016 | Ramsby et al. | |
| 2020/0252741 A1 | 8/2020 | Lyren | |
| 2022/0244776 A1 | 8/2022 | Naples et al. | |

* cited by examiner

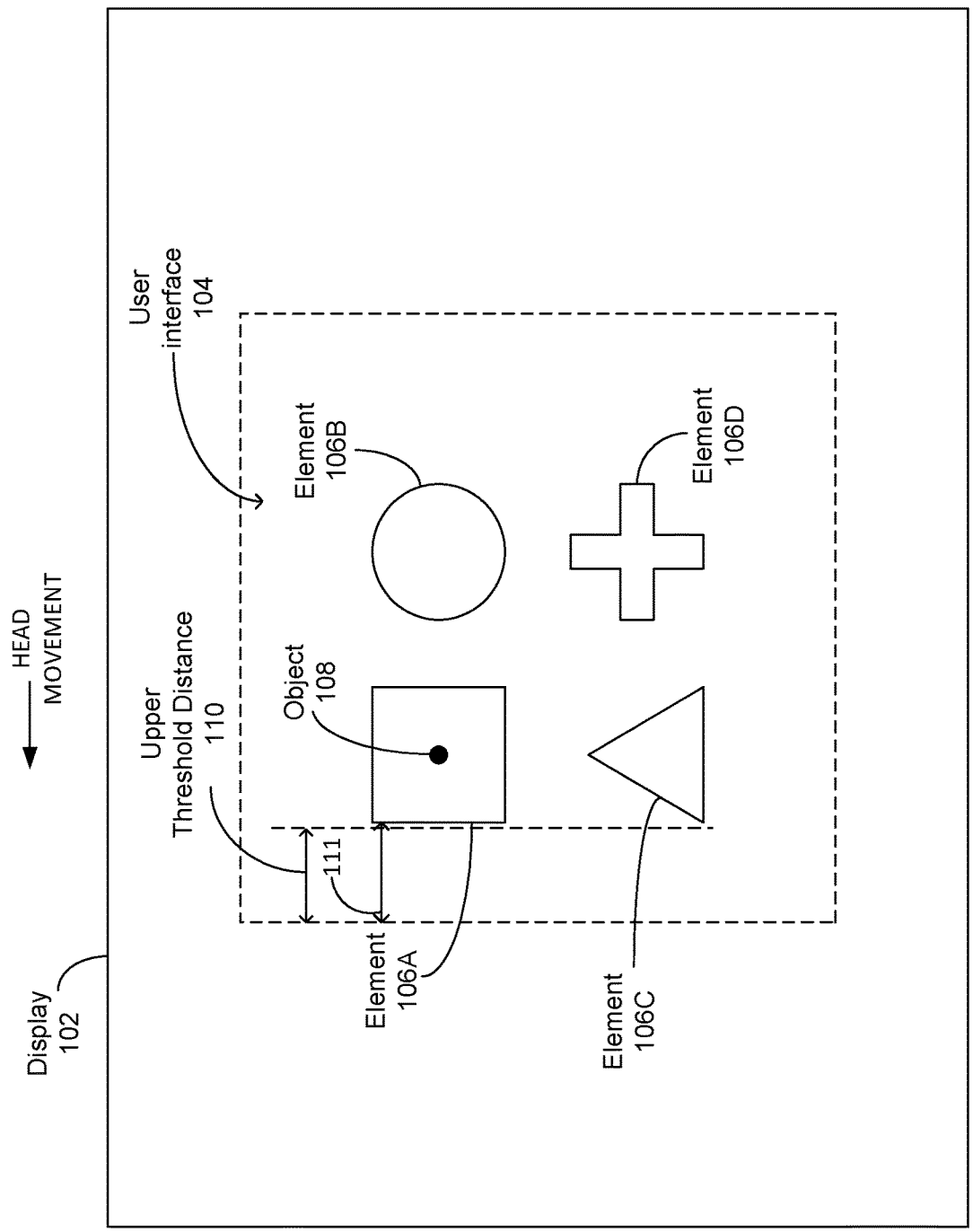

DECREASING SIZE OF USER INTERFACE ELEMENT IN DISPLAY OF HEAD-MOUNTED DEVICE

TECHNICAL FIELD

This description relates to head-mounted devices.

BACKGROUND

User interface elements can be presented within a display of a head-mounted device. Movement of the head-mounted device can result in movement of the user interface elements.

SUMMARY

Movement of a head-mounted device can result in movement of user interface elements within a display included in the head-mounted device. To avoid cropping the user interface elements, the head-mounted device can decrease a size of a user interface element as a distance of the user interface element from a boundary of a user interface included in the display decreases.

In some aspects, the techniques described herein relate to a method, the method including: presenting a first user interface element and a second user interface element within a user interface that is included in a display of a head-mounted device; in response to movement of the head-mounted device, moving the first user interface element and the second user interface element within the display, the movement of the first user interface element decreasing a boundary distance below a threshold distance, the boundary distance being based on a distance between the first user interface element and a boundary associated with the user interface; and decreasing a size of the first user interface element while the boundary distance is decreasing and is below the threshold distance.

In some aspects, the techniques described herein relate to a non-transitory computer-readable storage medium including instructions stored thereon that, when executed by at least one processor, are configured to cause a computing device to perform: presenting a first user interface element and a second user interface element within a user interface that is included in a display of the computing device; in response to movement of the computing device, moving the first user interface element and the second user interface element within the display, the movement of the first user interface element decreasing a boundary distance below a threshold distance, the boundary distance being based on a distance between the first user interface element and a boundary associated with the user interface; and decreasing a size of the first user interface element while the boundary distance is decreasing and is below the threshold distance.

In some aspects, the techniques described herein relate to a computing device including: a display; at least one processor; and a non-transitory computer-readable storage medium including instructions stored thereon that, when executed by the at least one processor, are configured to cause the computing device to perform: presenting a first user interface element and a second user interface element within a user interface that is included in the display; in response to movement of the computing device, moving the first user interface element and the second user interface element within the display, the movement of the first user interface element decreasing a boundary distance below a threshold distance, the boundary distance being based on a distance between the first user interface element and a boundary associated with the user interface; and decreasing a size of the first user interface element while the boundary distance is decreasing and is below the threshold distance.

The details of one or more implementations are set forth in the accompanying drawings and the description below. Other features will be apparent from the description and drawings, and from the claims.

BRIEF DESCRIPTION OF THE DRAWINGS

FIGS. 1A through 1K show a user interface with user interface elements inside a display.

Like reference numbers refer to like elements.

DETAILED DESCRIPTION

Figure 1A:
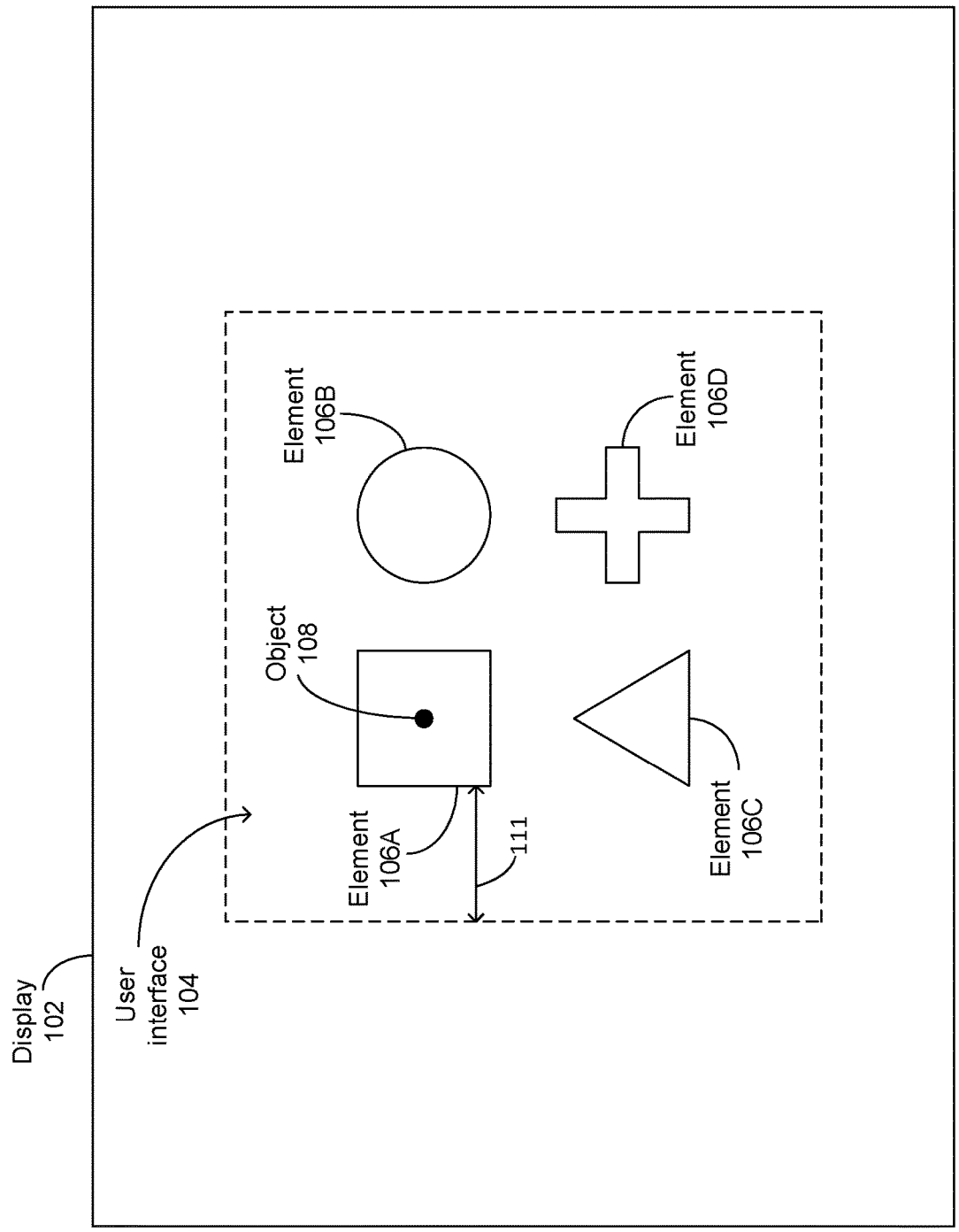

A head-mounted device includes a display and a user interface within the display. The head-mounted device can present user interface elements within the user interface. A user who is wearing the head-mounted device can interact with the user interface elements with eye gazes, oral instructions, and/or touching the head-mounted device.

In some implementations, the user interface, when displayed within a head-mounted device interface, can be "head-locked" while user interface elements within the user interface are "world-locked." The user interface, when head-locked, can remain in a stationary position on the display while the head-mounted device moves and different objects from the physical environment outside the head-mounted device are visible to the user and move with respect to the user interface. The user interface elements, when world-locked, can remain stationary with respect to the objects from the physical environment outside the head-mounted device while the head-mounted device moves. In such situations, the user interface elements move within the display.

The stationary position of the user interface on the display while the user interface elements move on the display, and/or the movement of the user interface with respect to the objects while the user interface elements remain stationary with respect to the objects, can cause the user interface elements to move with respect to the user interface. Movement of the user interface elements with respect to the user interface could cause the user interface elements to move off of the user interface and/or be cropped, resulting in a poor user interface.

To prevent the user interface elements from moving off of the user interface, the head-mounted device causes the user interface elements to decrease in size while their distance from a boundary of the user interface decreases after the distance has gone below an upper threshold distance (which can also be considered a maximum size threshold distance). In some implementations, once the distance has reached a lower threshold distance (which can also be considered a minimum size threshold distance), the user interface element will stop decreasing in size, and the head-mounted device can prevent the user interface element from becoming any closer to the boundary of the user interface. If the head-mounted device continues to move in the same direction, the user interface element will then become stationary with respect to the user interface at a reduced (e.g., minimum) size, and will move with respect to the objects in the same manner that the user interface moves with respect to the objects. The decreasing in size of the user interface elements, and "head-locking" of the user interface elements at the reduced size of the user interface elements when the user interface elements are close to the boundary of the user interface can create a smooth user experience.

FIGS. 1A through 1K show a user interface 104 with user interface elements 106A, 106B, 106C, 106D inside a display 102. The user interface 104 and display 102 are shown from the perspective of a user wearing a head-mounted device that includes the display 102. The display 102 can be included in a head-mounted device. From FIGS. 1A through 1E, the head-mounted device moves to the right, causing an object 108 to move to the left with respect to the head-mounted device, display 102, and user interface 104. From FIGS. 1A through 1D, the user interface elements 106A, 106B, 106C, 106D are world-locked with respect to the object 108, and remain stationary with respect to the object 108. From FIGS. 1D through 1E, the user interface elements 106A, 106B, 106C, 106D are no longer world-locked with respect to the object 108, and the user interface elements 106A, 106B, 106C, 106D move with respect to the object 108. From FIGS. 1E through 1J, the head-mounted device moves to the left, and the object 108 moves to the right with respect to the display 102 and the user interface 104. From FIGS. 1F through 1K, the user interface elements 106A, 106B, 106C, 106D are world-locked with respect to the object 108, and remain stationary with respect to the object 108. From FIGS. 1J to 1K, the head-mounted device moves up, causing the user interface elements 106A, 106B, 106C, 106D and the object 108 to move down with respect to the display 102 and the user interface 104.

FIG. 1A shows the display 102 in an original position, in which a first user interface element overlays an object 108 that is external to the head-mounted device. The display 102 can include one or more transparent lenses included in a head-mounted device, such as smartglasses. While four elements 106A, 106B, 106C, 106D, a first user interface element 106A, a second user interface element 106B, a third user interface element 106C, and a fourth user interface element 106D are shown in FIG. 1A, this is merely an example. Any number of user interface elements 106A, 106B, 106C, 106D (e.g., less than four elements or more than four elements) can be presented by the display 102. The boundaries of the user interface 104 (shown as having a square shape in FIG. 1A) may not be shown. The user interface elements 106A, 106B, 106C, 106D can also be arranged in a different pattern than shown in the example of FIG. 1A, such as in a line, a triangle, a circle, or an ellipse, as non-limiting examples. The user interface 104 can also have a different shape than shown in the example of FIG. 4, such as rectangular, triangular, circular, or oval-shaped, as non-limiting examples. The user interface elements 106A, 106B, 106C, 106D can be translucent (or partially translucent), and the object 108 external to the head-mounted device that includes the display 102, as well as any number of other objects in the physical environment outside the head-mounted device, can be visible through the display 102. A first boundary distance 111 can be a distance between the first user interface element 106A and a first boundary 112A associated with the user interface 104.

In some examples, the user interface 104 is "head-locked," in that the user interface 104 remains in a same location on the display 102 when the user moves the user's head and/or the head-mounted device moves. From the perspective of the user, the world-locked feature of the user interface 104 causes the user interface 104 to move with respect to physical objects, such as the object 108, that are visible through the display 102, when the head-mounted device moves, and/or the physical objects move with respect to the user interface 104 when the head-mounted device moves.

Within predefined limits of movement within the user interface 104, the user interface elements 106A, 106B, 106C, 106D can be "world-locked," in that within the predefined limits, the user interface elements 106A 106B, 106C, 106D will remain in fixed positions with respect to physical objects, such as the object 108, that are visible through the display 102. The fixed positions of the user interface elements 106A, 106B, 106C, 106D with respect to physical objects causes the user interface elements 106A, 106B, 106C, 106D to move within the display 102 and/or with respect to the user interface 104 when the head-mounted device moves. Beyond the predefined limits, such as when one or more of the user interface elements 106A, 106B, 106C, 106D that is closest to a boundary of the user interface 104 is within and/or equal to a lock threshold distance of the boundary of the user interface 104, the user interface elements 106A, 106B, 106C, 106D can remain in fixed positions on the display 102 and/or with respect to the user interface 104. Beyond the predefined limits, such as when one or more of the user interface elements 106A, 106B, 106C, 106D that is closes to a boundary of the user interface 104 is within and/or equal to a lock threshold distance of the boundary of the user interface 104, physical objects, such as the object 108 can move with respect to the user interface elements 106A, 106B, 106C, 106D when the head-mounted device moves.

Figure 1B:
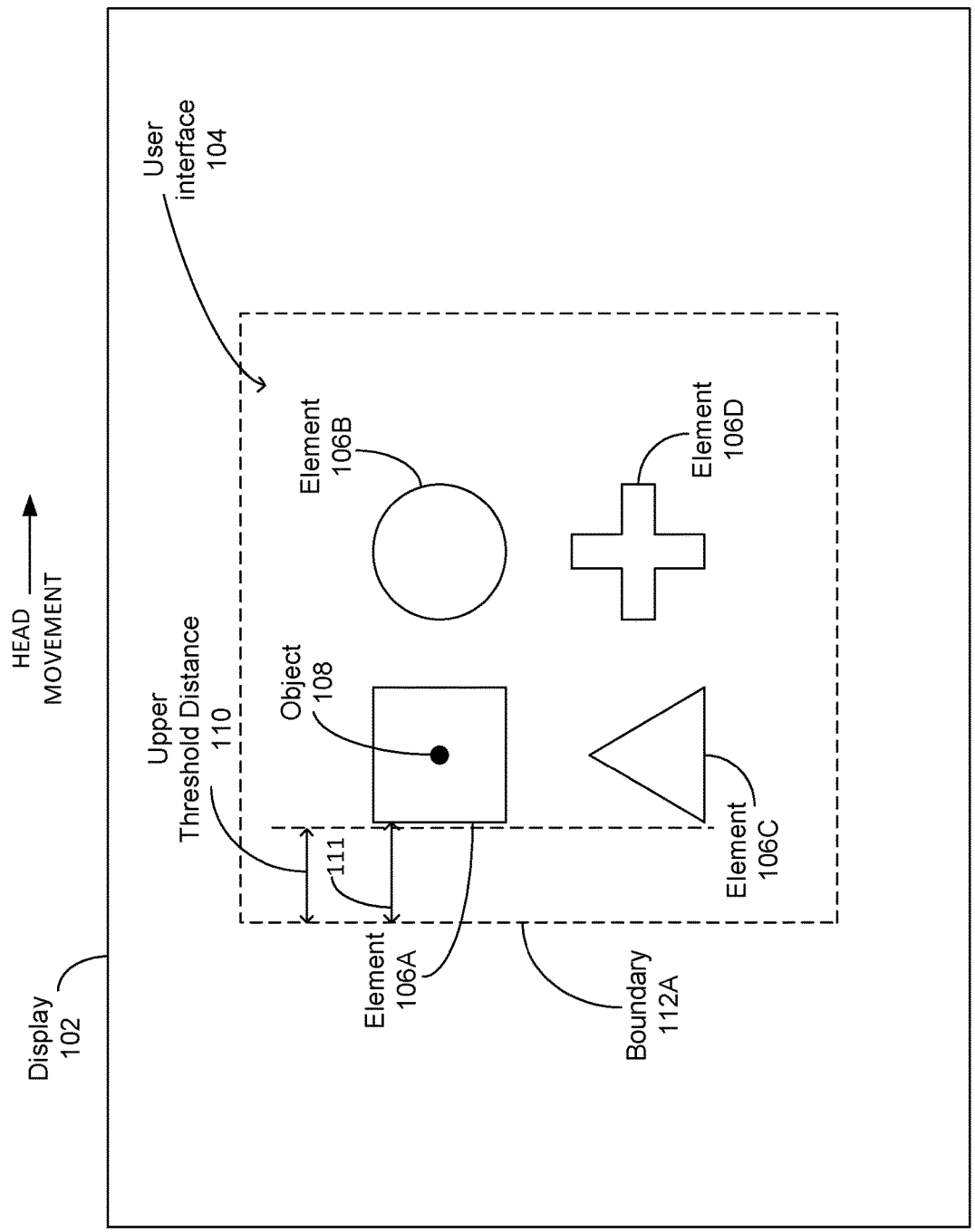

FIG. 1B shows the display 102 after the head-mounted device has moved and/or rotated to the right. The movement and/or rotation of the head-mounted device to the right causes the world-locked elements, such as the user interface elements 106A, 106B, 106C, 106D, to move to the left on the display 102. The movement to the left by the user interface elements 106A, 106B, 106C, 106D causes the user interface elements 106A, 106B, 106C, 106D to maintain respective positions of the user interface elements 106A, 106B, 106C, 106D with respect to physical objects, such as the object 108, that are visible through the display 102. As shown in FIG. 1B, the first user interface element 106A still surrounds the object 108, and/or the object 108 is still visible at the center of the first user interface element 106A, after the object 108 and the user interface elements 106A, 106B, 106C, 106D have moved left on the display 102 from the positions of the object 108 and the user interface elements 106A, 106B, 106C, 106D in FIG. 1A. The user interface 104 remains in a same location after the movement of the head-mounted device and user interface elements 106A, 106B, 106C, 106D.

In the example shown in FIG. 1B, the user interface elements 106A, 106B, 106C, 106D, including the first user interface element 106A, are not within, and/or are outside, an upper threshold distance 110 from a first boundary 112A of the user interface 104. A vertical dashed line shows the boundary for the upper threshold distance 110. The upper threshold distance 110 can be a rectangular band within and/or along the border of the user interface 104. The first boundary distance 111, which can be a distance between the first user interface element 106A and a first boundary 112A associated with the user interface 104, is equal to or greater than the upper threshold distance 110. Because the first boundary distance 111 is equal to or greater than, and/or is not below, the upper threshold distance 110, the first user interface element 106A (as well as the remaining user interface elements 106B, 106C, 106D) have not decreased in size, and/or are presented at their maximum size. The boundary distance 111 is smaller in FIG. 1B than in FIG. 1A because of the head movement to the right and the world-locked status of the first user interface element 106A.

The first boundary distance 111 can be measured from a closest portion of the first user interface element 106A to the first boundary 112A associated with the user interface 104, from a center of the first user interface element 106A to the first boundary 112A associated with the user interface 104, or from any portion of the first user interface element 106A to the first boundary 112A associated with the user interface 104, as non-limiting examples. In FIGS. 1B through 1H, the boundary distances from the first user interface element 106A and the third user interface element 106C to the first boundary 112A are less than boundary distances from the second user interface element 106B and the fourth user interface element to the first boundary 112A.

The first boundary 112A can be an edge of the user interface 104 beyond which the user interface elements 106A, 106B, 106C, 106D cannot extend, or a location before or beyond which the user interface elements 106A, 106B, 106C, 106D cannot extend. The boundaries, including the first boundary 112A, associated with the user interface 104, may or may not be visible and/or presented by the display 102 to the user.

Figure 1C:
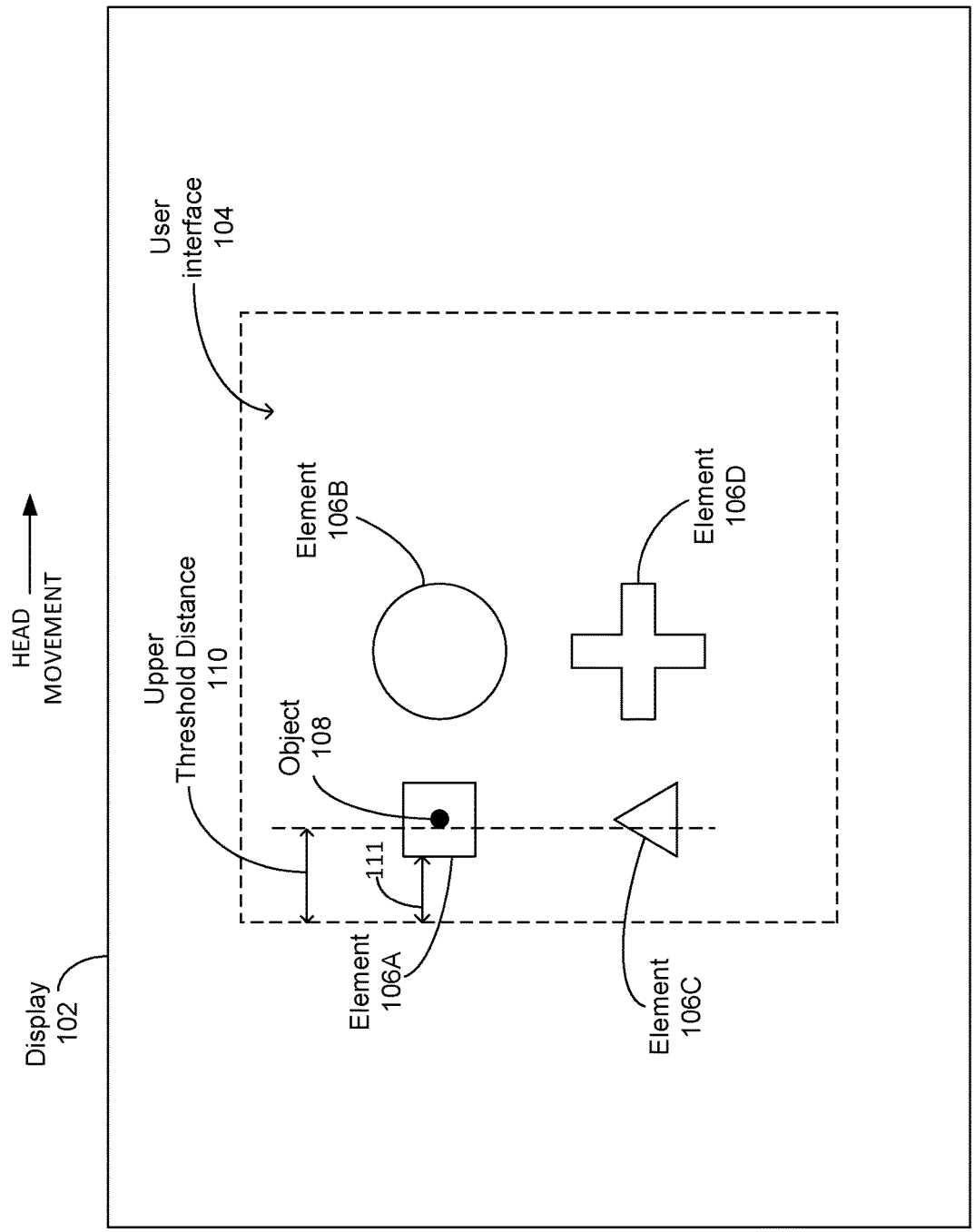

FIG. 1C shows the display 102 after the head-mounted device has moved and/or rotated further to the right than in FIG. 1B. The further movement and/or rotation of the head-mounted device to the right causes the world-locked elements, such as the user interface elements 106A, 106B, 106C, 106D, to move further to the left on the display 102. The further movement to the left by the user interface elements 106A, 106B, 106C, 106D causes the user interface elements 106A, 106B, 106C, 106D to maintain respective positions of the user interface elements 106A, 106B, 106C, 106D with respect to physical objects, such as the object 108, that are visible through the display 102. As shown in FIG. 1C, the first user interface element 106A still surrounds the object 108, and/or the object 108 is still visible at the center of the first user interface element 106A, after the object 108 and the user interface elements 106A, 106B, 106C, 106D have moved left on the display 102 from the positions of the object 108 and the user interface elements 106A, 106B, 106C, 106D in FIG. 1B. The user interface 104 remains in a same location after the movement of the head-mounted device and user interface elements 106A, 106B, 106C, 106D.

In the example of FIG. 1C, the movements of the first and third user interface elements 106A, 106C has decreased the first boundary distance 111 below the upper threshold distance 110. The head-mounted device decreases the size of the first and third user interface elements 106A, 106C while the first boundary distance 111 is decreasing and is below the upper threshold distance 110. In some examples, the head-mounted device continuously decreases the size of the first and third user interface elements 106A, 106C while the first boundary distance 111 is decreasing and is below the upper threshold distance 110. Once the first boundary distance 111 is equal to or below the upper threshold distance 110, the head-mounted device can reduce the sizes of the first and third user interface elements 106A, 106C as functions of the first boundary distance 111. In some examples, the head-mounted device 204 can maintain a fixed gap between the user interface elements 106A, 106B, 106C, 106D while the first and third user interface elements 106A, 106C decrease in size. In some examples, while the first and third user interface elements 106A, 106C decrease in size and the second and fourth user interface elements 106B, 106D maintain constant in size, the distances between the first and second user interface elements 106A, 106B and between the third and fourth user interface elements 106C, 106D can remain constant, maintaining the fixed gap between the user interface elements 106A, 106B, 106C, 106D.

Figure 1D:
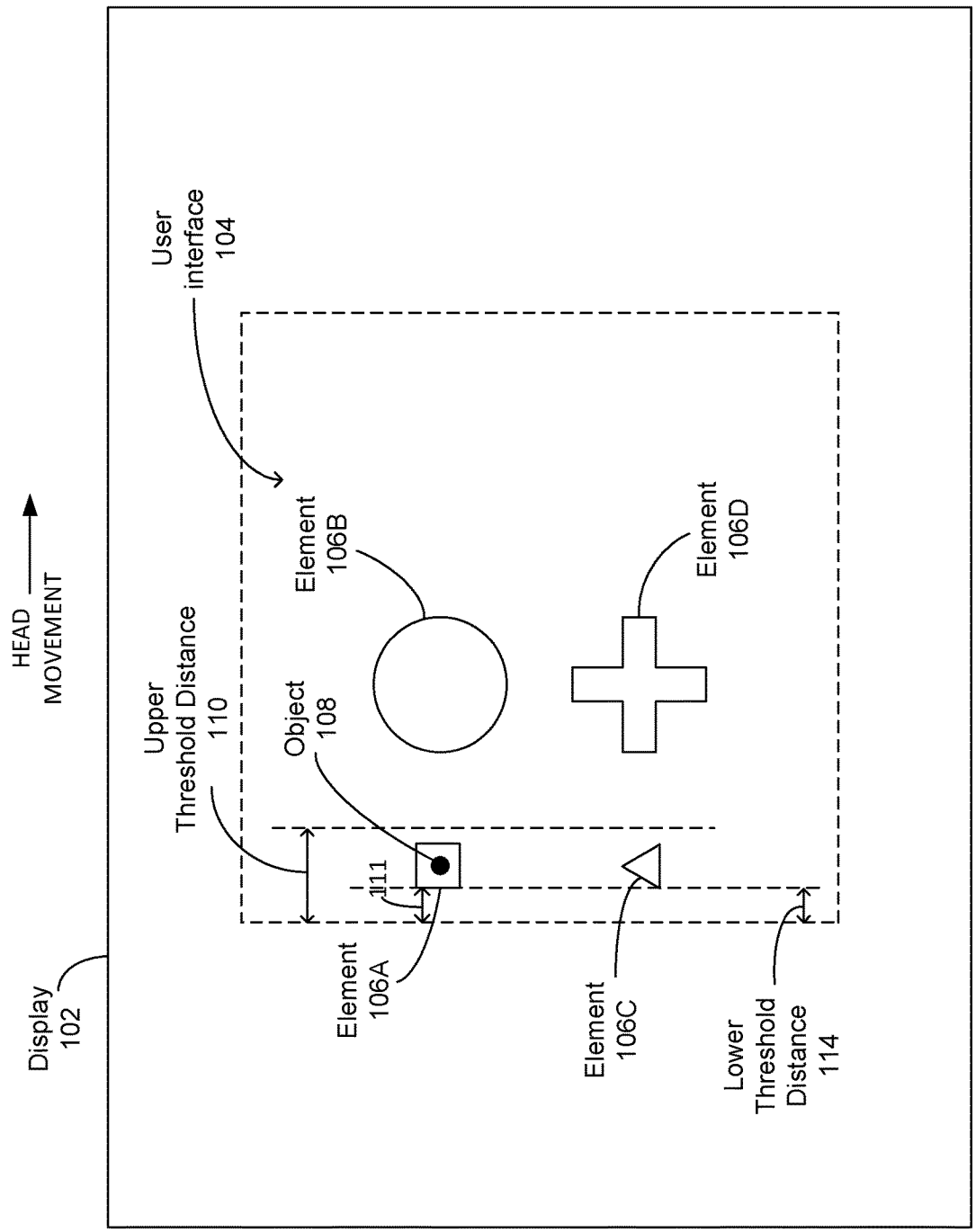

FIG. 1D shows the display 102 after the head-mounted device has moved and/or rotated further to the right than in FIG. 1C. The further movement and/or rotation of the head-mounted device to the right causes the world-locked elements, such as the user interface elements 106A, 106B, 106C, 106D, to move further to the left on the display 102. The further movement to the left by the user interface elements 106A, 106B, 106C, 106D causes the user interface elements 106A, 106B, 106C, 106D to maintain respective positions of the user interface elements 106A, 106B, 106C, 106D with respect to physical objects, such as the object 108, that are visible through the display 102. As shown in FIG. 1D, the first user interface element 106A still surrounds the object 108, and/or the object 108 is still visible at the center of the first user interface element 106A, after the object 108 and the user interface elements 106A, 106B, 106C, 106D have moved left on the display 102 from the positions of the object 108 and the user interface elements 106A, 106B, 106C, 106D in FIG. 1C. The user interface 104 remains in a same location after the movement of the head-mounted device and user interface elements 106A, 106B, 106C, 106D.

In the example of FIG. 1D, the movements of the first and third user interface elements 106A, 106C have continued to decrease the first boundary distance 111 below the upper threshold distance 110. In the example of FIG. 1C, the movements of the first and third user interface elements 106A, 106C have not caused the first boundary distance 111 to fall below a lower threshold distance 114. Based on the first boundary distance 111 continuing to decrease below the upper threshold distance 110 without the first boundary distance 111 falling below the lower threshold distance 114, the head-mounted device continues to reduce the sizes of the first and third user interface elements 106A, 106C.

In some examples, when the first boundary distance 111 reaches the lower threshold distance 114, the user interface elements 106A, 106C for which the boundary distance has reached the lower threshold distance 114 will not become any smaller, and/or will maintain the same, minimum user interface element size.

The head-mounted device can maintain a minimum boundary distance between the user interface elements 106A, 106B, 106C, 106D and the respective boundaries of the user interface 104. In some examples, the minimum boundary distance is equal to the lower threshold distance 114. In some examples, the minimum boundary distance is greater than the lower threshold distance 114. In some examples, the minimum boundary distance is less than the lower threshold distance 114. In some examples, the minimum boundary distance is zero.

Once the boundary distance of the user interface elements 106A, 106B, 106C, 106D, such as the first and third user interface elements 106A, 106C, has reached the minimum boundary distance, the respective user interface elements 106A, 106B, 106C, 106D can become head-locked, wherein no further movement of the respective user interface elements 106A, 106B, 106C, 106D occurs in response to further movement of the head-mounted device in the direction that caused the boundary distance to reach the minimum boundary distance.

Figure 1E:
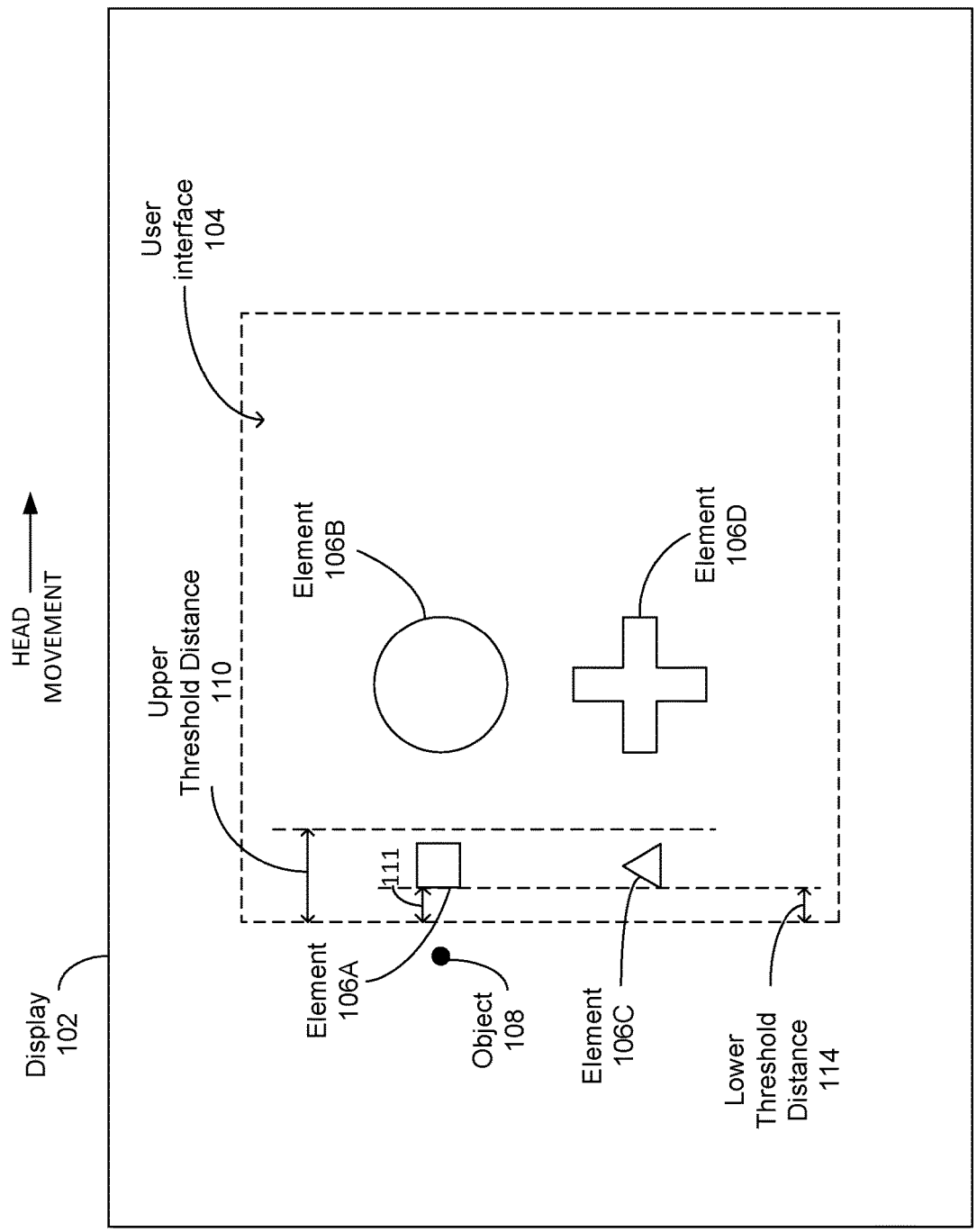

FIG. 1E shows the display 102 after the head-mounted device has moved and/or rotated further to the right than in FIG. 1D. In the example shown in FIG. 1E, the first boundary distance 111 for the first and third user interface elements has reached the lower threshold distance 114. Based on the first boundary distance 111 for the first and third user interface elements having reached the lower threshold distance 114, the first and third user interface elements 106A, 106C are head-locked and cannot move any further to the left, and/or the locations of the first and third user interface elements 106A, 106C are fixed with respect to the user interface 104 and/or display 102. Because the head-mounted device has continued to move to the right, the object 108 outside the head-mounted device appears further to the left than in FIG. 1D. In the example shown in FIG. 1E, the movement to the right of the head-mounted device, and the matching of the first boundary distance 111 to the minimum boundary distance, causes the object 108 to appear outside (such as to the left) of the user interface 104. Because the object 108 appears outside of the user interface 104, the first user interface object 106A no longer surrounds the object 108, and/or the object 108 is no longer inside the first user interface object 106A.

Figure 1F:
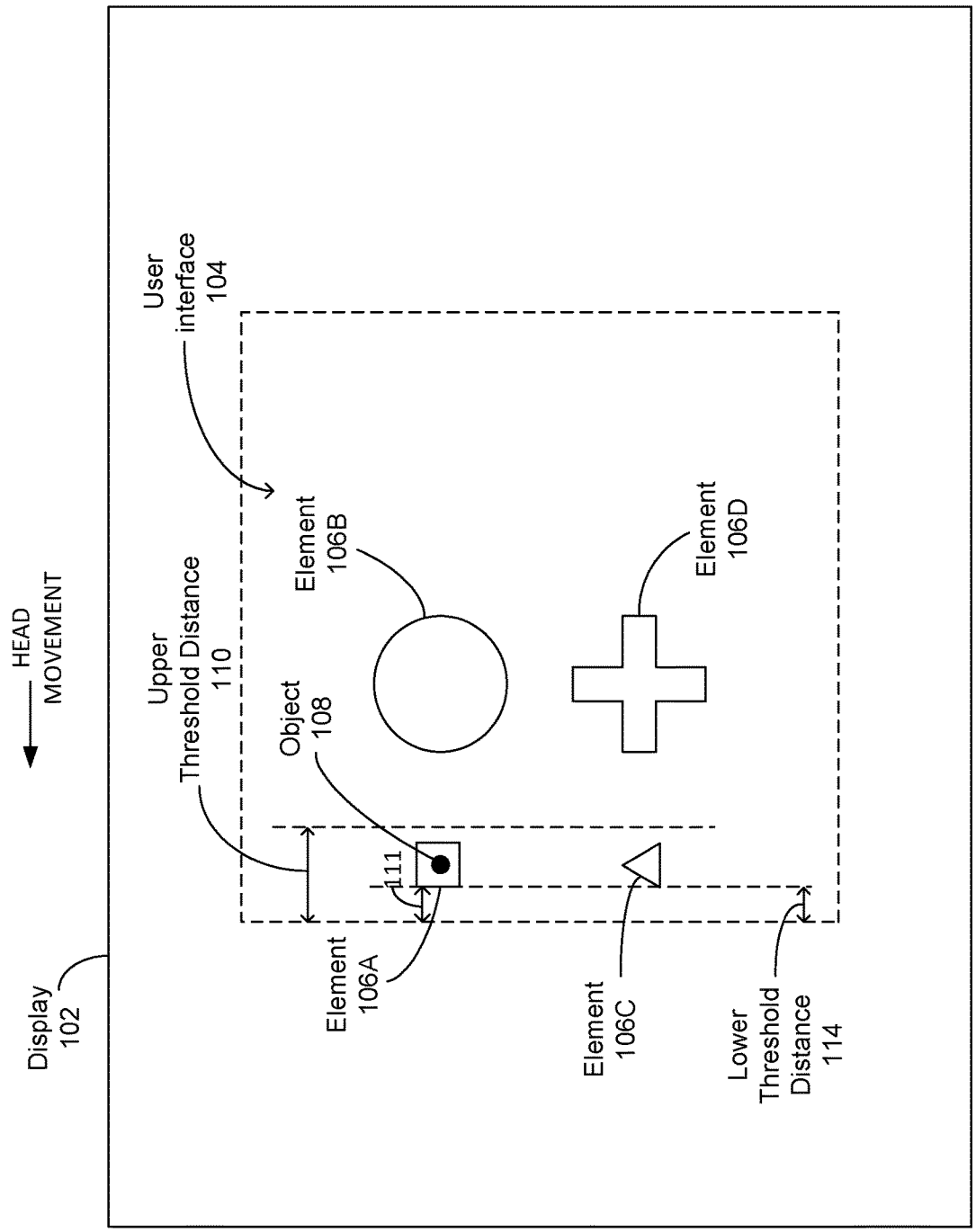

FIG. 1F shows the display 102 after the head-mounted device has moved back to the left. The movement to the left of the head-mounted device causes the object 108 to move to the right relative to the display 102, user interface 104, and first user interface element 106A. The movement to the left of the display 102 and relative movement to the right of the object 108 causes the first user interface element 106A to surround the object 108, and/or the object 108 to appear inside the first user interface element 106A, as in FIG. 1D, before the further movement to the right of the head-mounted device. With the head-mounted device returning to the position at which the boundary distances of the first and third user interface elements 106A, 106C (including the first boundary distance 111) match the minimum boundary distance, the user interface elements 106A, 106B, 106C, 106D are again world-locked, and remain stationary with respect to objects outside of the head-mounted device such as the object 108 and move within the user interface 104 and/or display 102 when the head-mounted device moves to the left, in a direction that increases the first boundary distance 111, and/or in a direction opposite to the direction that cause the first and third user interface elements 106A, 106C to decrease in size.

Figure 1G:
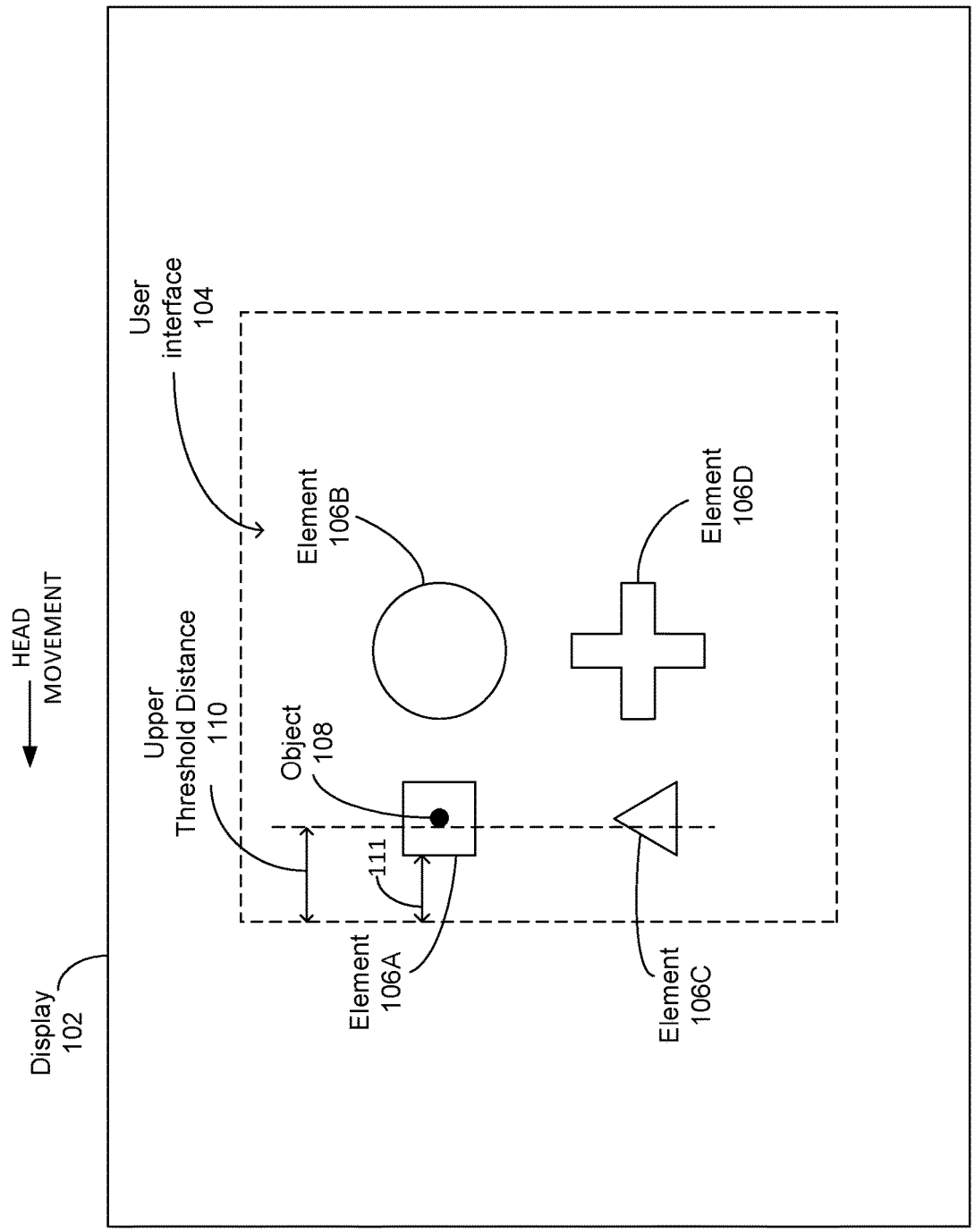

FIG. 1G shows the display 102 after the head-mounted device has continued moving back to the left. The head-mounted device has continued moving to the left beyond the leftward movement described with respect to FIG. 1F. The further movement of the head-mounted device to the left, and/or in a direction opposite to the direction that caused the first and third user interface elements 106A, 106C to decrease in size, and the world-locked status of the first and third user interface elements 106A, 106C, causes the first boundary distance 111 to increase. The head-mounted device and/or display 102 responds to the increase in the first boundary distance 111 while the first boundary distance is less than the upper threshold distance 110 by increasing the sizes of the first and third use interface elements 106A, 106C.

FIG. 1H shows the display 102 after the head-mounted device has continued moving to the left. The head-mounted device has continued moving to the left beyond the leftward movement described with respect to FIG. 1H. The continued movement to the left of the head-mounted device has caused the first and third user interface elements to move to the right within the display 102. The movement to the right within the display 102 of the first and third user interface elements 106A, 106C has caused the first boundary distance of the first and third user interface elements 106A, 106C to increase to the value of the upper threshold distance 110. The head-mounted device and/or display 102 responds to the increase in value of the first boundary distance 111, while the first boundary distance 111 is less than the upper threshold distance 110, by increasing the size of the first and third user interface elements 106A, 106C. At the point when the first boundary distance 111 reaches the upper threshold distance 110, the sizes of the first and third user interface elements 106A, 106B have returned to the maximum sizes of the first and third user interface elements 106A, 106B that were shown in FIGS. 1A and 1B before the first boundary distance 111 decreased below the upper threshold distance 110.

Figure 1I:
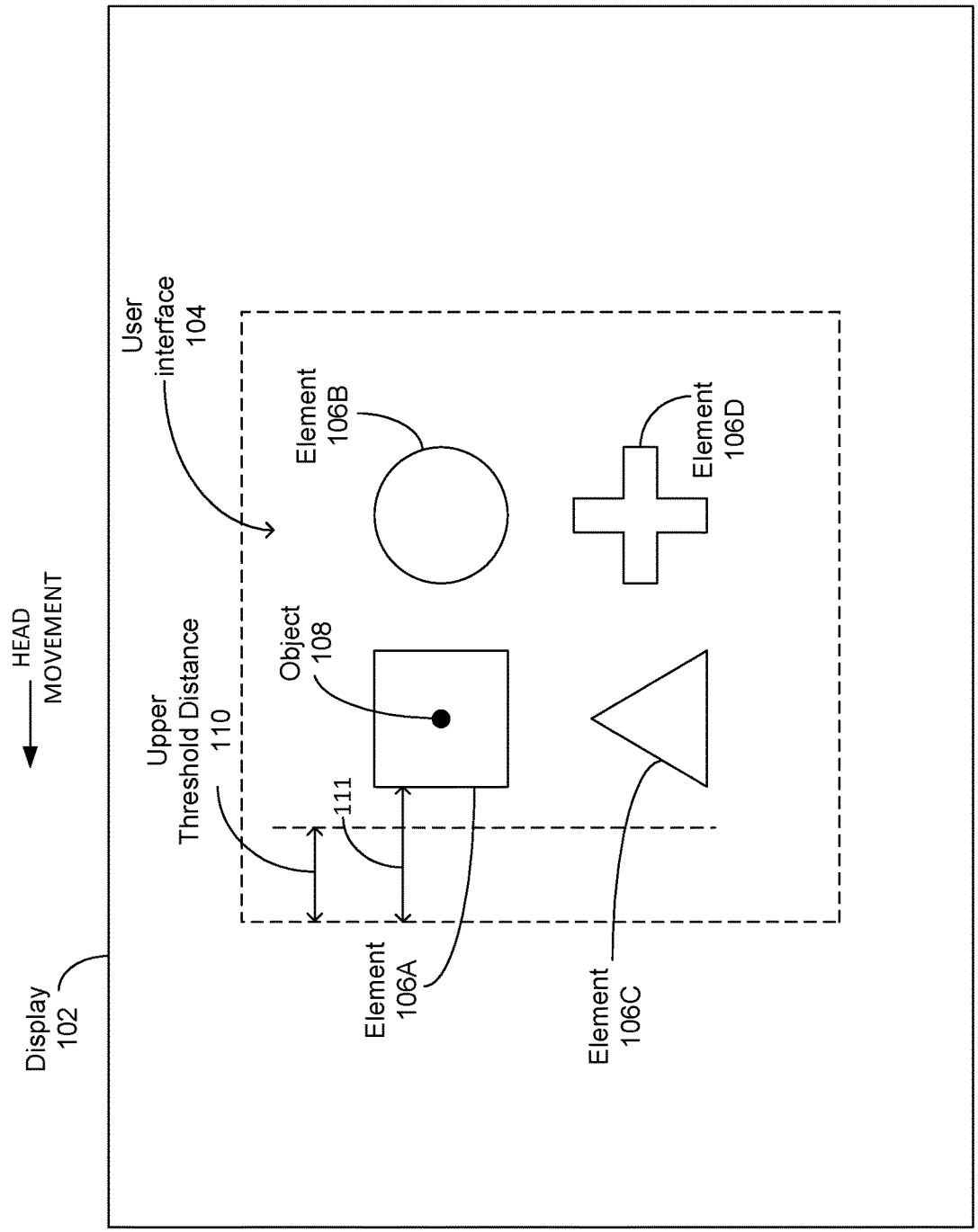

FIG. 1I shows the display 102 after the head-mounted device has continued moving further to the left. The continued movement to the left of the head-mounted device, beyond the movement to the left shown in FIG. 1H, has returned the head-mounted device to the original position shown in FIG. 1A. The return to the original position of the head-mounted device has caused the user interface elements 106A, 106B, 106C, 106D to return to the original positions of the user interface elements 106A, 106B, 106C, 106D shown in FIG. 1A. Based on the first boundary distances 111 of the first and third user interface elements 106A, 106C being greater than the upper threshold distance 110, the first and third user interface elements 106A, 106C no longer increase in size, and/or maintain the same size, the maximum size of the first and third user interface elements 106A, 106C. The head-mounted device 204 can maintain the sizes of the first and third user interface elements 106A, 106C after the first boundary distance 111 exceeds the upper threshold distance 110. The sizes of the first and third user interface elements 106A, 106C can be maintained at maximum sizes that were sizes of the first and third user interface elements 106A, 106C before the boundary distances were below the upper threshold distance 110, as shown in FIGS. 1A and 1B.

Figure 1J:
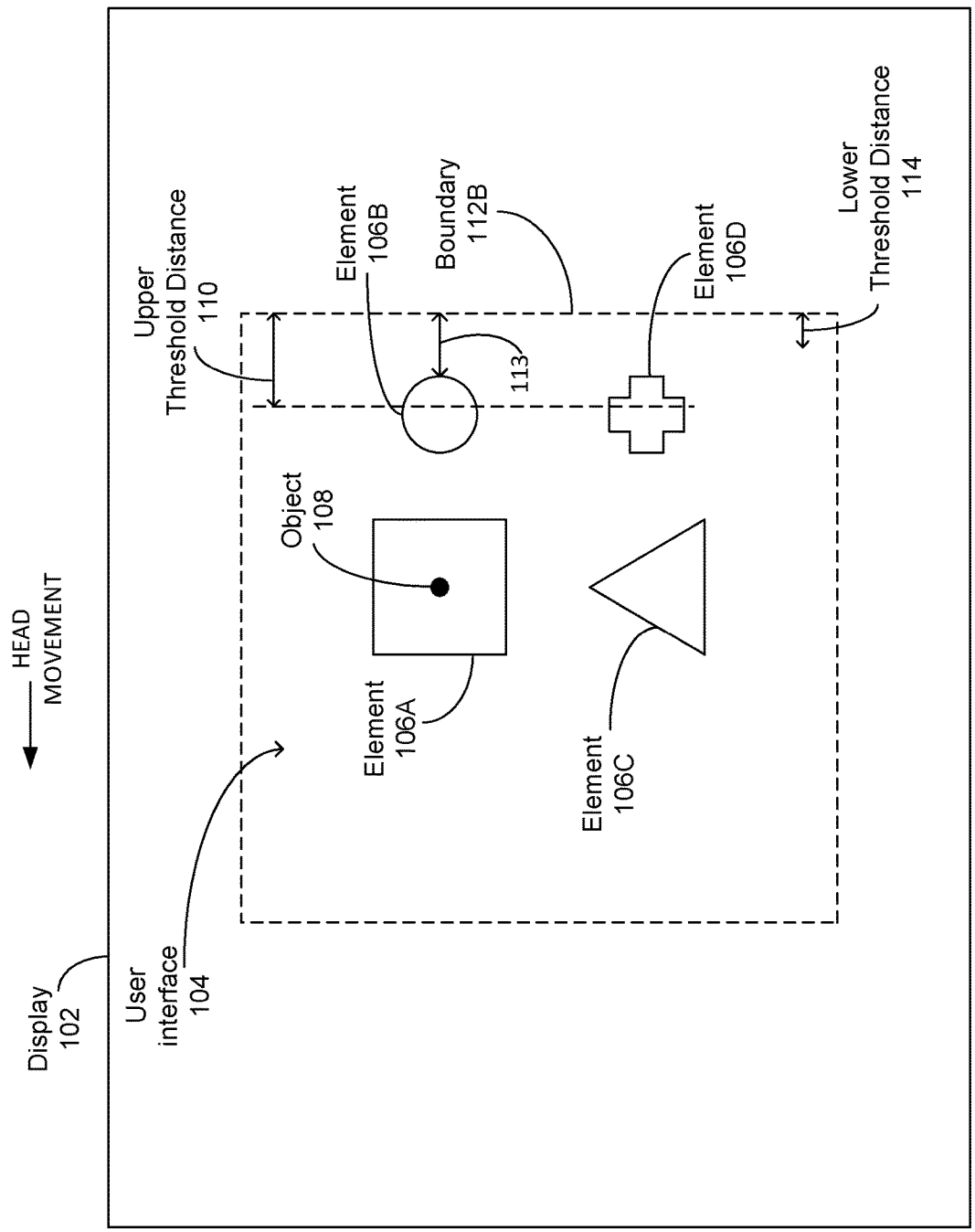

FIG. 1J shows the display 102 after the head-mounted device has continued moving further to the left. The continued movement to the left of the head-mounted device, beyond the movement to the left shown in FIG. 1I, has caused the user interface elements 106A, 106B, 106C, 106D to move to the right. The movement to the right of the user interface elements 106A, 106B, 106C, 106D has caused a second boundary distance 113 of the second and fourth user interface elements 106B, 106D to decrease below the upper threshold distance 110. The maximum threshold distance 110 with respect to the second boundary 112B of the user interface 104 can be the same as or different then the maximum threshold distance 110 with respect to the first boundary 112A of the user interface 104. The second boundary distance 113 is a distance from the second and fourth user interface elements 106B, 106D to a second boundary 112B associated with the user interface 104. The second boundary 112B can be on an opposite side of the user interface 104 from the first boundary 112A. The head-mounted device and/or display 102 responds to the decreasing of the second boundary distance of the second and fourth user interface elements 106B, 106D below the upper threshold distance 110 by decreasing sizes of the second and fourth user interface elements 106B, 106D. The head-mounted device and/or display 102 can decrease the sizes of the second and fourth user interface elements 106B, 106D while the second boundary distance is decreasing and is between the upper threshold distance 110 and the lower threshold distance 114. The head-mounted device and/or display 102 can increase the sizes of the second and fourth user interface elements 106B, 106D while the second boundary distance is increasing and is between the upper threshold distance 110 and the lower threshold distance 114.

Figure 1K:
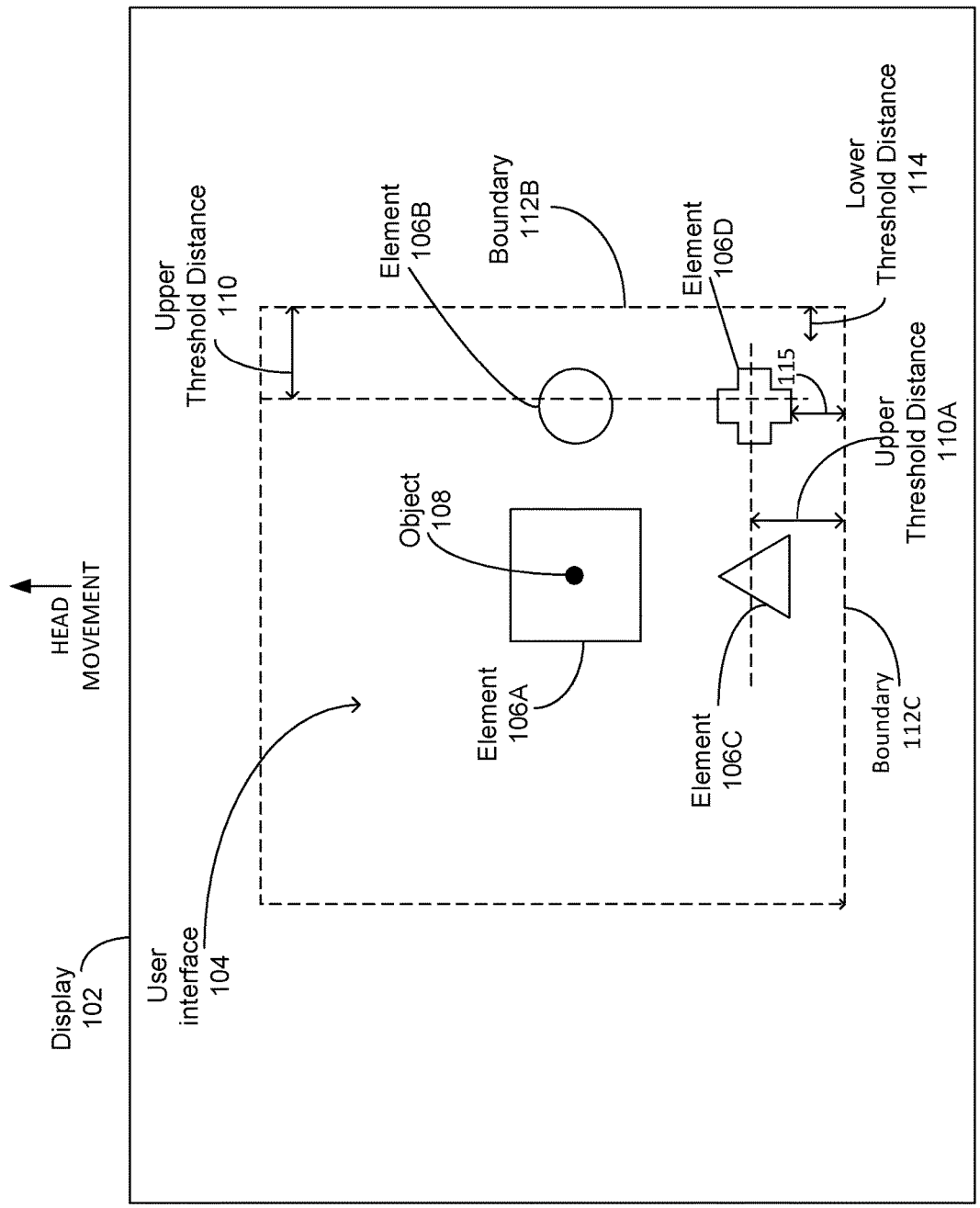

FIG. 1K shows the display 102 after the head-mounted device has moved up. The head-mounted device has moved up after the leftward movement shown and described with respect to FIG. 1J. The upward movement of the head-mounted device causes the user interface elements 106A, 106B, 106C, 106D to move downward toward a third boundary 112C associated with the user interface 104. The third boundary 112C can be adjacent to the first boundary 112A and/or the second boundary 112B. The downward movement of the user interface elements 106A, 106B, 106C, 106D can cause a third boundary distance 115, from the third and fourth user interface elements 106C, 106D to the third boundary 112C, to decrease below an upper threshold distance 110. A horizontal dashed line shows the upper threshold distance 110 with respect to the third boundary 112C. The upper threshold distance 110 with respect to the third boundary 112C can be the same or different from the upper threshold distances 110 with respect to the first and second boundaries 112A, 112B. The head-mounted device and/or display 102 can respond to the decreasing of the third boundary distance 115 below the upper threshold distance 110 by decreasing sizes of the third and fourth user interface elements 106C, 106D.

Figure 2:
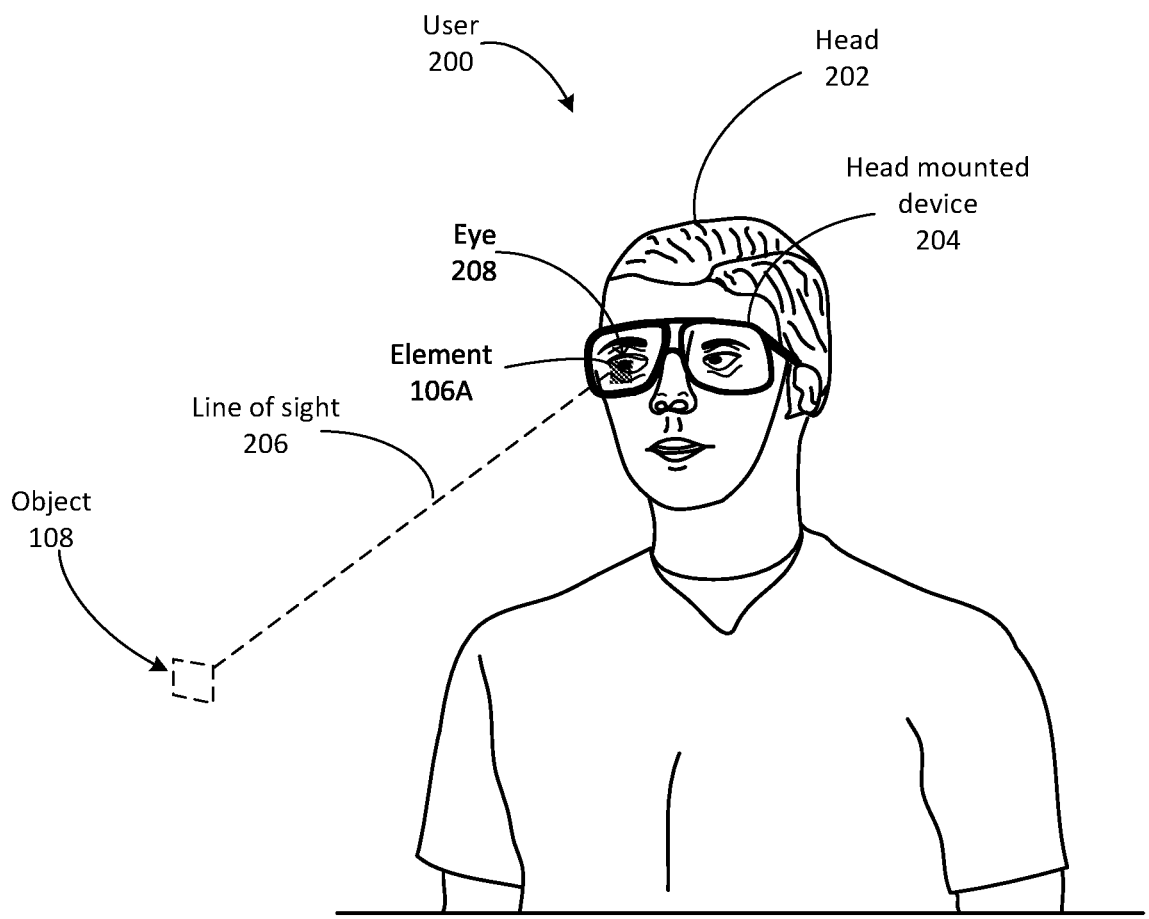
FIG. 2 shows a user wearing a head-mounted device and an object that is external to the head-mounted device.

FIG. 2 shows a user 200 wearing a head-mounted device 204 and the object 108 that is external to the head-mounted device 204. The head-mounted device 204 is mounted on a head 202 of a user 200. The head-mounted device 204 includes the display 102 shown and described with respect to FIGS. 1A through 1K. The user 200 can move the head 202 of the user 200, causing the head-mounted device 204 to rotate. Rotation of the head-mounted device 204 can cause the display 102 to move to the left and right and up, as shown in FIGS. 1A through 1K. When the head-mounted device 204 is in the world-locked mode, as shown in FIGS. 1A through 1D and 1F through 1K, and the first user interface element 106A remains in a fixed position with respect to the object 108, and/or moves within the display 102 (not labeled in FIG. 2), a line of sight 206 extends from an eye 208 of the user 200, through the first user interface element 106A, and to the object 108. While the line of sight 206 extends from the eye 208 through the first user interface element 106A, and to the object 108 in the example shown in FIG. 2, the line of sight 206 can extend from the eye 208 through a location on the display 102 that is a fixed distance in a fixed direction from the first user interface element 106A to the object 108.

Figure 3:
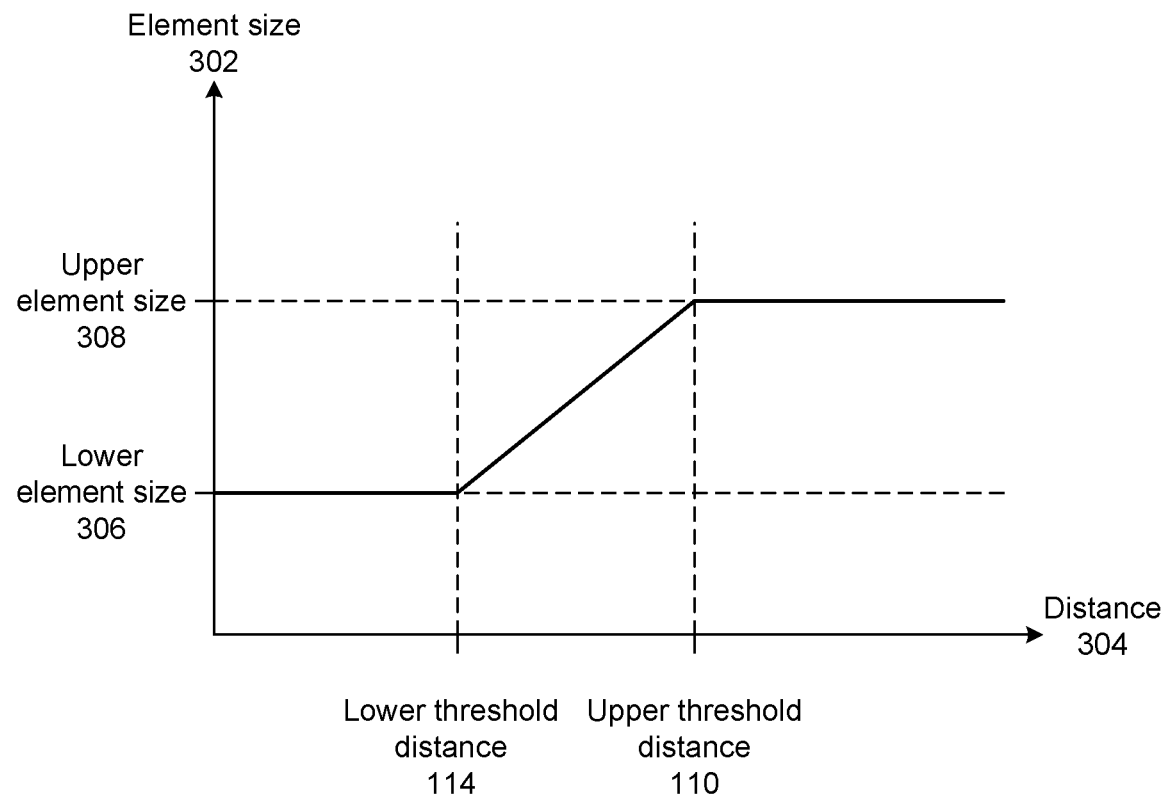
FIG. 3 is a graph showing size of a user interface element as a function of distance of the user interface element from a boundary associated with the user interface.

FIG. 3 is a graph showing size 302 of a user interface element 106A, 106B, 106C, 106D as a function of distance 304 of the user interface element 106A, 106B, 106C, 106D from a boundary 112A, 112B, 112C associated with the user interface 104. As shown in FIG. 3, when the boundary distance 304 is equal to or greater than the upper threshold distance 110, the size of a given user interface element 106A, 106B, 106C, 106D is constant at an upper (which can also be considered a maximum) size of the elements 106A, 106B, 106C, 106D. When the boundary distance 304 is less than or equal to the lower threshold distance 114, the size of the user interface element 106A, 106B, 106C, 106D is constant at a lower (which can also be considered a minimum) size of the elements 106A, 106B, 106C, 106D. In some examples, the lower threshold distance 114 can be zero.

When the boundary distance 304 is between the lower threshold distance 114 and the upper threshold distance 110, and/or is greater than the lower threshold distance 114 and is less than the upper threshold distance 110, the size 302 of the user interface element 106A, 106B, 106C, 106D increases as the boundary distance 304 increases. When the boundary distance 304 is between the lower threshold distance 114 and the upper threshold distance 110, and/or is greater than the lower threshold distance 114 and is less than the upper threshold distance 110, the size 302 of the user interface element 106A, 106B, 106C, 106D decreases as the boundary distance 304 decreases. While the graph of FIG. 3 shows the size 302 of the user interface element 106A, 106B, 106C, 106D as a linear function of the boundary distance 304, the size 302 of the user interface element 106A, 106B, 106C, 106D can be any type of function of the boundary distance 304 in which the size 302 increases as the boundary distance 304 increases and the size 302 decreases as the boundary distance 304 decreases. The the size 302 of the user interface element 106A, 106B, 106C, 106D could, for example, be a stepwise function or sinusoidal function of the boundary distance 304.

Figure 4:
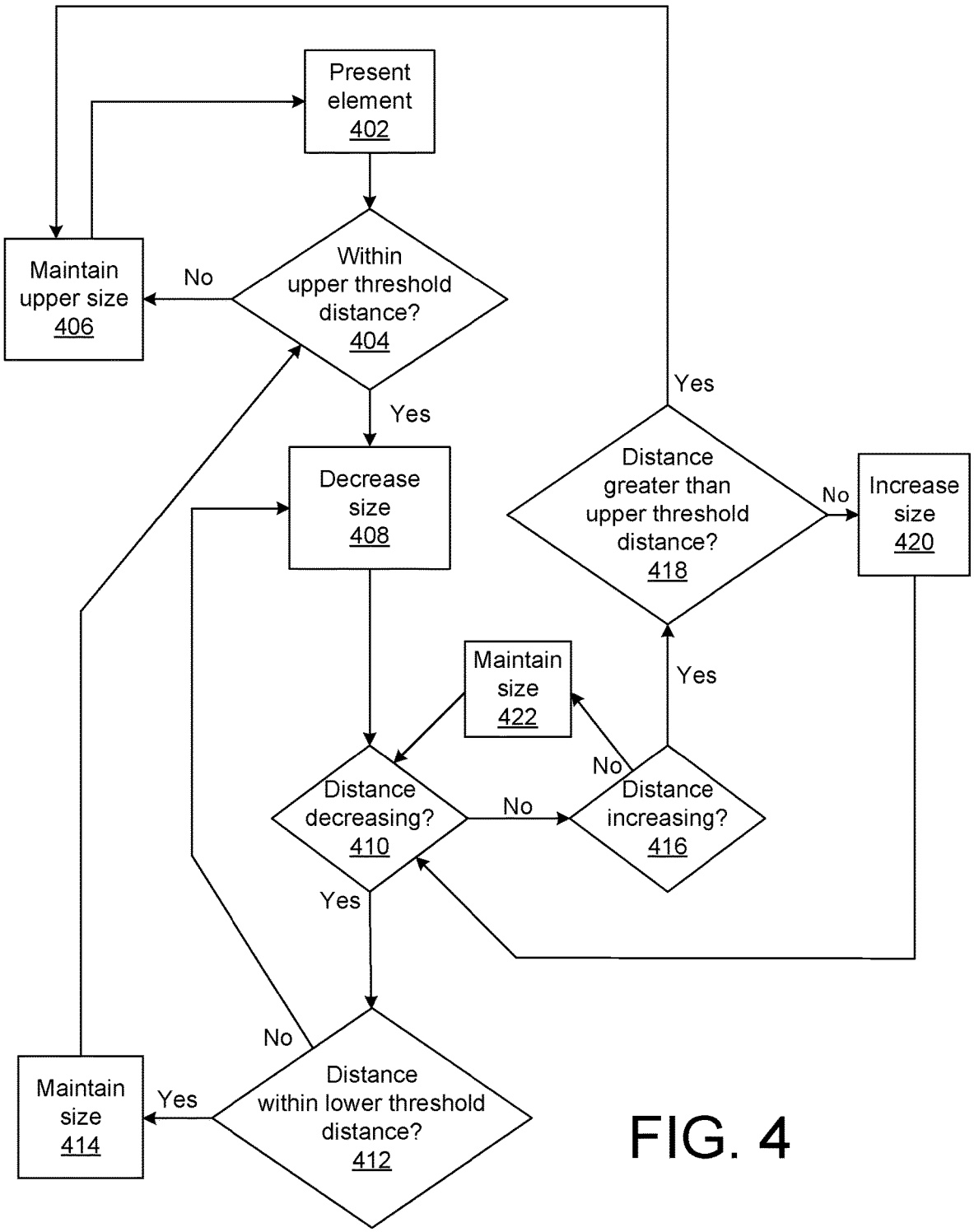
FIG. 4 is a flowchart showing a method performed by the head-mounted device.

FIG. 4 is a flowchart showing a method performed by the head-mounted device 204. The head-mounted device 204 can present a user interface element(s) 106A, 106B, 106C, 106D (402). The head-mounted device 204 can present a user interface element(s) 106A, 106B, 106C, 106D (402) on the display 102, as shown in FIG. 1A through 1K. While the functions, methods, and/or techniques described herein are described as being performed by the head-mounted device 204, these functions, methods, and/or techniques could also be performed in a split computing situation in which a companion device (such as a smartphone or a smartwatch) in communication with the head-mounted device performs some or all of the functions described herein.

The user 200 can move a head 202 of the user 200, causing the head-mounted device 204 to move. While the head-mounted device 204 is in a world-locked mode, the movement of the head-mounted device 204 can cause the user interface element(s) 106A, 106B, 106C, 106D to move along the display 102.

In response to the user interface element(s) 106A, 106B, 106C, 106D moving along the display 102, the head-mounted device 204 can determine whether the boundary distance 304 of the user interface element(s) 106A, 106B, 106C, 106D is within the upper threshold distance 110 (404). If the boundary distance 304 is not within the upper threshold distance 110, then the head-mounted device 204 can maintain the size(s) of the user interface element(s) 106A, 106B, 106C, 106D at the upper (and/or maximum) size (406).

If the boundary distance 304 is within the upper threshold distance 110, then the head-mounted device 204 can decrease the size(s) of the user interface element(s) 106A, 106B, 106C (408).

After decreasing the size(s) of the user interface element(s) 106A, 106B, 106C (408), the head-mounted device 204 can determine whether the boundary distance 304 is still decreasing and/or whether the boundary distance 304 is continuing to decrease (410). If the head-mounted device 204 determines that the boundary distance 304 is continuing to decrease, then the head-mounted device 204 can determine whether the boundary distance 304 is within the lower threshold distance 114 (412). If the boundary distance 304 is not within the lower threshold distance 114, then the head-mounted device 204 can continue decreasing the size of the user interface element(s) 106A, 106B, 106C, 106D (408).

If the boundary distance 304 is within the upper threshold distance 110, then the head-mounted device 204 can maintain the size(s) of the user interface element(s) 106A, 106B, 106C, 106D (414) at the minimum size. After maintaining the size(s) of the user interface element(s) 106A, 106B, 106C, 106D (414), the head-mounted device 204 can determine whether the user interface element(s) 106A, 106B, 106C, 106D has moved again, and if so, determine whether the boundary distance 304 is within the upper threshold distance 110 (404).

If the head-mounted device 204 determines that the boundary distance 304 is not decreasing, then the head-mounted device 204 can determine whether the boundary distance 304 is increasing (416). If the head-mounted device 204 determines that the boundary distance 304 is not increasing, then the head-mounted device 204 can maintain the size (422) of the user interface element(s) 106A, 106B, 106C, 106D. After determining that the size of the user interface element(s) 106A, 106B, 106C, 106D should be maintained (422), the head-mounted device 204 can determine whether the boundary distance 304 is decreasing (410).

If the head-mounted device 204 determines that the boundary distance 304 is increasing, then the boundary distance 304 can determine whether the boundary distance 304 is greater than the upper threshold distance 110 (418). If the head-mounted device 204 determines that the boundary distance 304 is greater than the upper threshold distance 110, then the user interface element(s) 106A, 106B, 106C, 106D must already be at the upper (and/or maximum) size, and the head-mounted device 204 will maintain the size of the user interface element(s) 106A, 106B, 106C, 106D at the upper (and/or maximum) size (406).

If the head-mounted device 204 determines that the boundary distance 304 is not greater than the upper threshold distance 110, then the head-mounted device 204 will increase the size of the user interface element(s) 106A, 106B, 106C, 106D (420). The head-mounted device 204 will increase the size of the user interface element(s) 106A, 106B, 106C, 106D (420) while the boundary distance 304 is increasing and the boundary distance 304 is between the lower threshold distance 114 and the upper threshold distance 110, and/or is greater than the lower threshold distance 114 and less than the upper threshold distance 110. After increasing the size of the user interface element(s) 106A, 106B, 106C, 106D (420), the head-mounted device 204 will determine whether the boundary distance 304 is decreasing (410). In accordance with the method described with respect to the flowchart shown in FIG. 4, the head-mounted device 204 can maintain the size(s) of the user interface element(s) 106A, 106B, 106C, 106D as functions of the respective boundary distances 304 of the user interface element(s) 106A, 106B, 106C, 106D, as shown in the graph of FIG. 3.

Figure 5A:
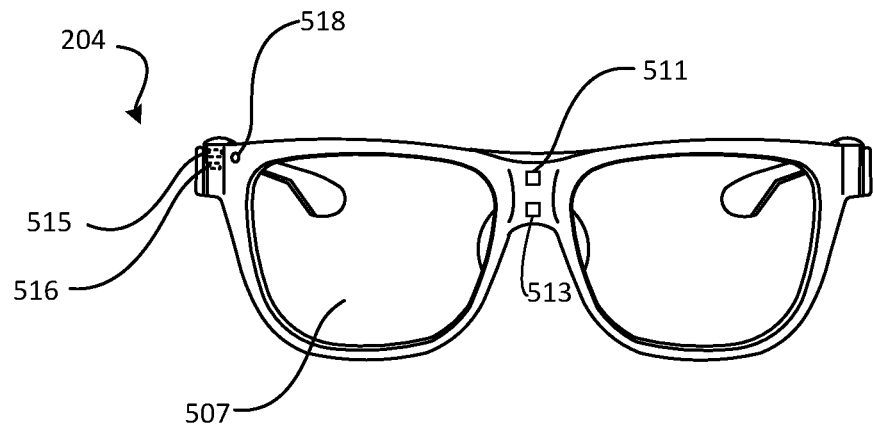
FIGS. 5A, 5B, and 5C show an example of the head-mounted device.
Figure 5B:
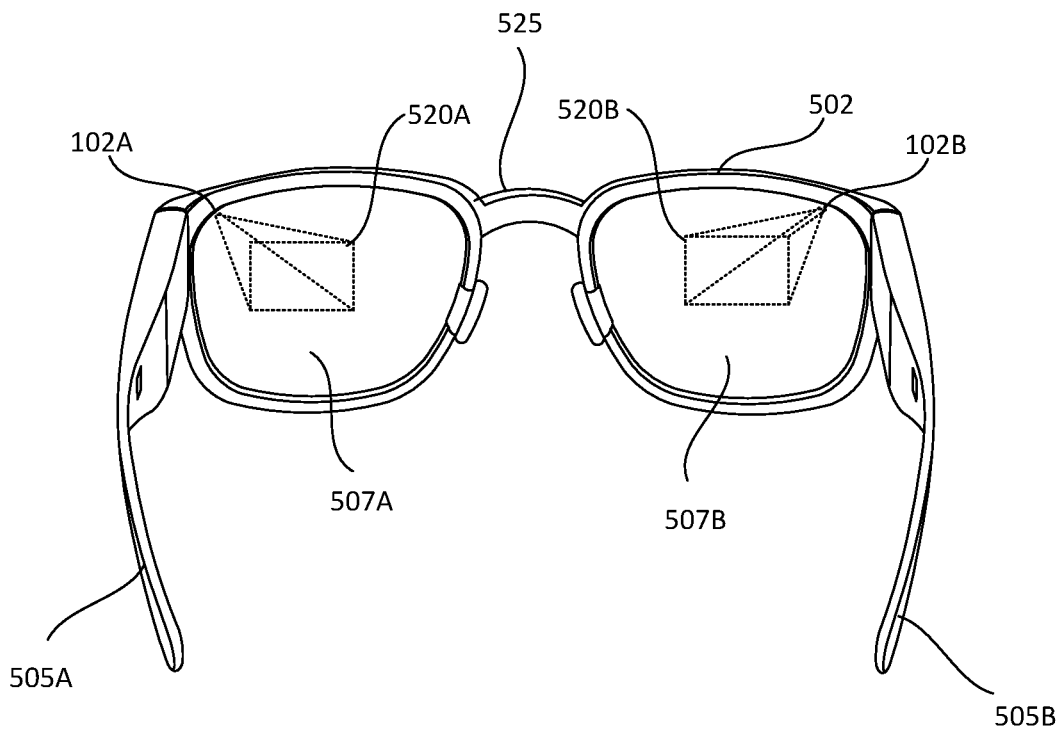
Figure 5C:
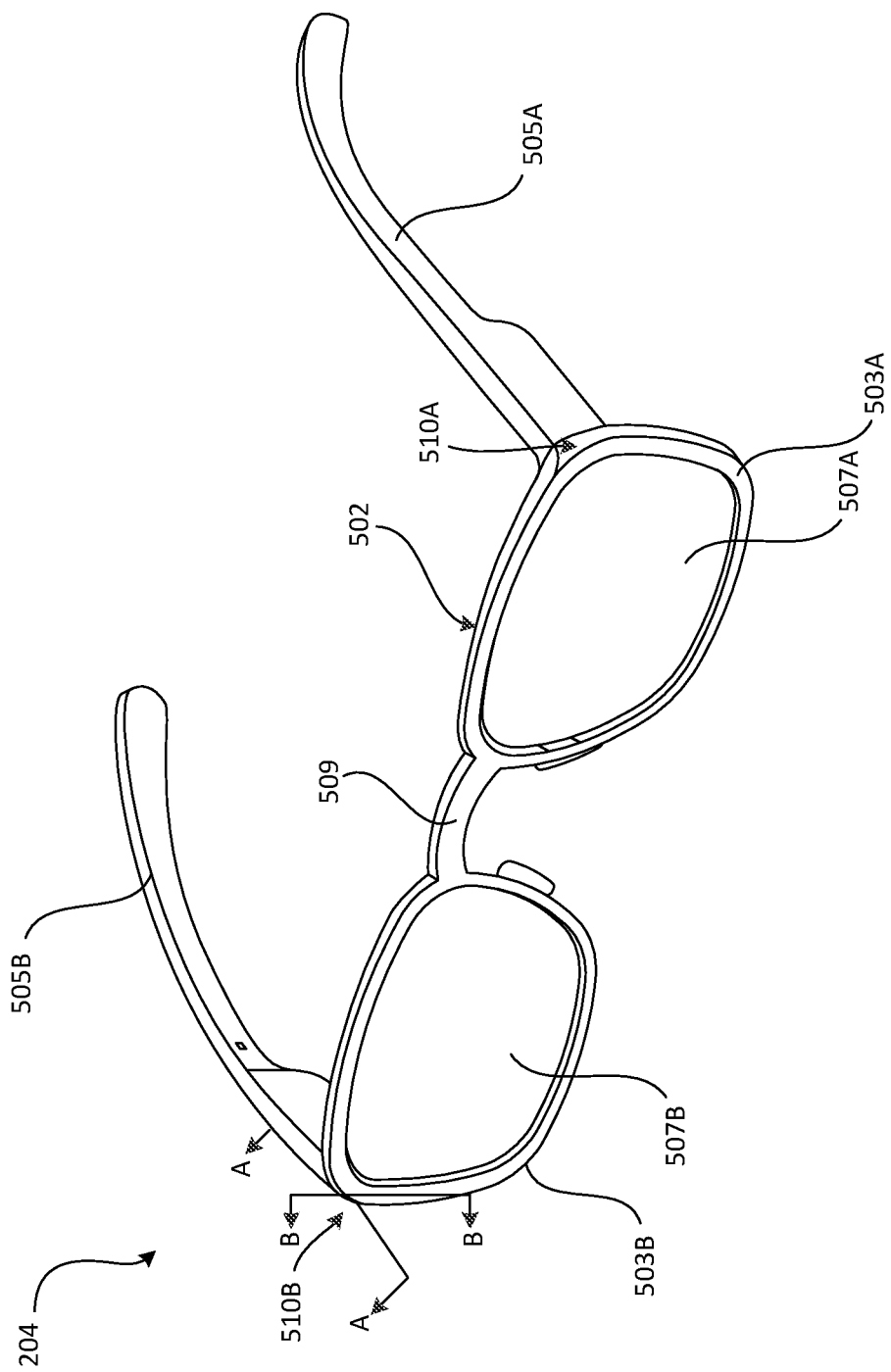

FIGS. 5A, 5B, 5C show an example of the head-mounted device. As shown in FIGS. 5A, 5B, and 5C, the example head-mounted device 204 includes a frame 502. The frame 502 includes a front frame portion defined by rim portions 503A, 503B surrounding respective optical portions in the form of lenses 507A, 507B, with a bridge portion 509 connecting the rim portions 503A, 503B. Arm portions 505A, 505B are coupled, for example, pivotably or rotatably coupled, to the front frame by hinge portions 510A, 510B at the respective rim portion 503A, 503B. In some examples, the lenses 507A, 507B may be corrective/prescription lenses. In some examples, the lenses 507A, 507B may be an optical material including glass and/or plastic portions that do not necessarily incorporate corrective/prescription parameters. Displays 102A, 102B (which can be components of the display 102 shown in FIGS. 1A through 1K) may be coupled in a portion of the frame 502. In the example shown in FIG. 5B, the displays 102A, 102B are coupled in the arm portions 505A, 505B and/or rim portions 503A, 503B of the frame 502. In some examples, the head-mounted device 204 can also include an audio output device 516 (such as, for example, one or more speakers), an illumination device 518, at least one processor 511, and an outward facing image sensor 515 (or camera). The at least one processor 511 can execute instructions, such as instructions stored in memory 513, to perform any combination of methods, functions, and/or techniques described herein. The head-mounted device 204 can include memory 513. The memory can include a non-transitory computer-readable storage medium comprising instructions stored thereon that, when executed by the at least one processor 511, are configured to cause the head-mounted device 204 to perform any combinations of methods, functions, and/or techniques described herein. In some examples, the head-mounted device 204 may include a see-through near-eye display. For example, the displays 102A, 102B may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 507A, 507B, next to content (for example, digital images, user interface elements, virtual content, and the like) generated by the displays 102A, 102B. In some implementations, waveguide optics may be used to depict content on the displays 102A, 102B via outcoupled light 520A, 520B.

Figure 6:
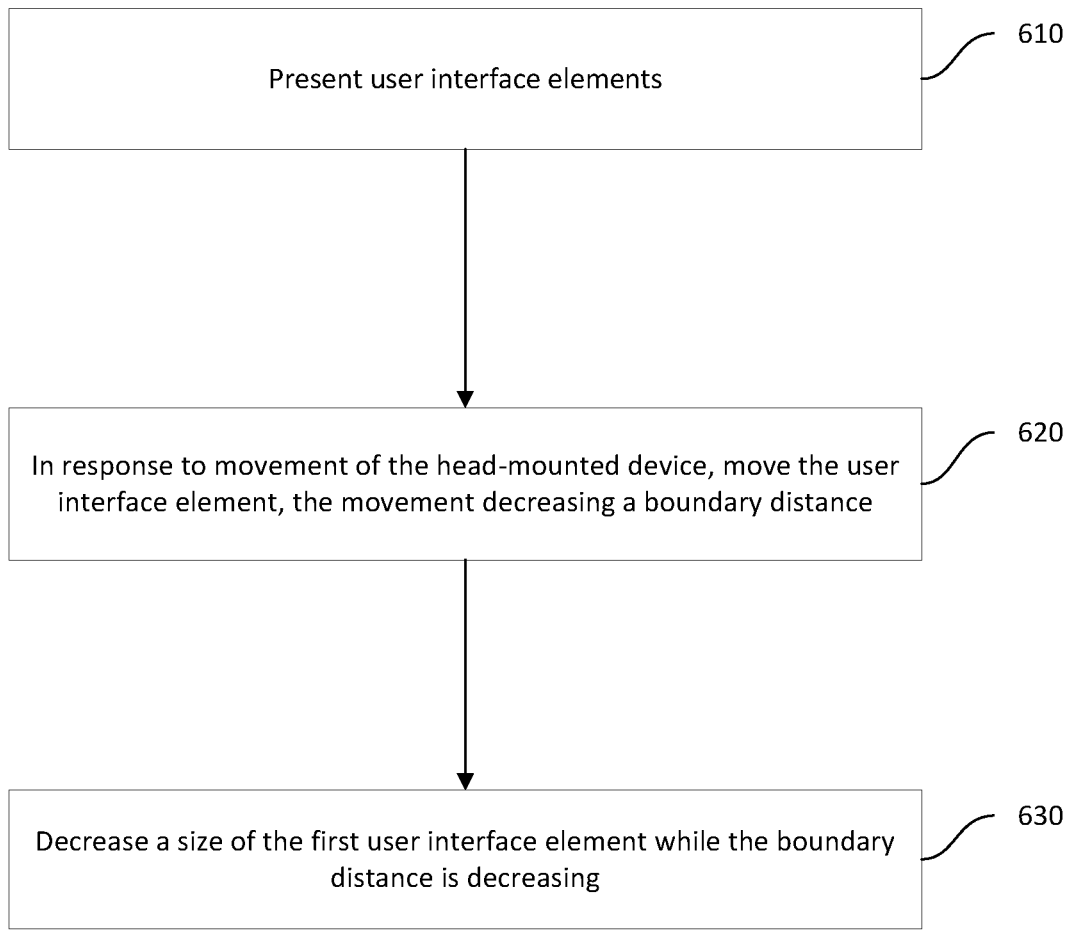
FIG. 6 is a flowchart showing a method performed by the head-mounted device.

FIG. 6 is a flowchart showing a method performed by the head-mounted device 204. The method can include presenting a first user interface element and a second user interface element within a user interface that is included in a display of a head-mounted device (610). The method can include, in response to movement of the head-mounted device, moving the first user interface element and the second user interface element within the display, the movement of the first user interface element decreasing a boundary distance below a threshold distance, the boundary distance being based on a distance between the first user interface element and a boundary associated with the user interface (620). The method can include decreasing a size of the first user interface element while the boundary distance is decreasing and is below the threshold distance (630).

In some examples, the threshold distance is a maximum size threshold distance, decreasing the size of the first user interface element includes decreasing the size of the first user interface element until the boundary distance reaches a minimum size threshold distance, and the method further comprises maintaining the size of the first user interface element at a minimum user interface element size after the boundary distance reaches the minimum size threshold distance.

In some examples, the method further includes maintaining the boundary distance at a minimum boundary distance after the size of the first user interface element has been decreased to the minimum user interface element size.

In some examples, the minimum boundary distance is equal to the minimum size threshold distance.

In some examples, the user interface moves, in response to the movement of the head-mounted device, with respect to an object that is external to the head-mounted device, the first user interface element remains stationary, in response to the movement of the head-mounted device, with respect to the object that is external to the head-mounted device, and the second user interface element remains stationary, in response to the movement of the head-mounted device, with respect to the object that is external to the head-mounted device.

In some examples, a size of the second user interface element remains constant while the size of the first user interface element decreases.

In some examples, while the size of the first user interface element is decreasing and the size of the second user interface element is maintained, the distance of the first user interface element from the boundary associated with the user interface is less than a distance of the second user interface element from the boundary associated with the user interface.

In some examples, the movement of the head-mounted device is a first movement of the head-mounted device; the movement of the first user interface element and the second user interface element within the display is a first movement of the first user interface element and the second user interface element within the display; the method further comprises, in response to a second movement of the head-mounted device, causing second movement of the first user interface element and the second user interface element within the display, the second movement of the head-mounted device being opposite to the first movement of the head-mounted device, the second movement of the first user interface element and the second user interface element within the display increasing the boundary distance; and the method further comprises increasing the size of the first user interface element while the boundary distance is increasing and is below the threshold distance.

In some examples, the method further includes maintaining the size of the first user interface element at a maximum user interface element size after the boundary distance exceeds the threshold distance, the maximum user interface element size being a size of the first user interface element before the boundary distance was below the threshold distance.

In some examples, the boundary associated with the user interface is a first boundary associated with the user interface, the boundary distance is a first boundary distance, the second movement of the first user interface element and the second user interface element within the display decreases a second boundary distance below the threshold distance, the second boundary distance being based on a distance between the second user interface element and a second boundary associated with the user interface, and the method further comprises decreasing a size of the second user interface element while the second boundary distance is decreasing and is below the threshold distance.

In some examples, the movement of the head-mounted device is rotation of the head-mounted device in a first rotational direction; the movement of the first interface element and the second user interface element includes moving the user interface in a first direction within the display with respect to an object external to the head-mounted device, the first direction corresponding to the first rotational direction; and the method further comprises in response to rotation of the head-mounted device in a second rotational direction, moving the first user interface element and the second user interface element within the display with respect to the object in a second direction, the second rotational direction being opposite to the first rotational direction and the second direction being opposite to the first direction, the movement of the first user interface element and the second user interface element within the display with respect to the object in the second direction causing the boundary distance to increase; and increasing the size of the first user interface element based on the distance of the first user interface element from the boundary associated with the user interface increasing.

In some examples, the threshold distance is a maximum size threshold distance; the decreasing the size of the first user interface element includes decreasing the size of the first user interface element from a maximum size to a minimum size while the distance of the first user interface element from the boundary associated with the user interface decreases from the maximum size threshold distance to a minimum size threshold distance; and the method further comprises, in response to further movement of the head-mounted device, moving the first user interface element and the second user interface element with respect to an object that is external to the head-mounted device, the first user interface element remaining at the minimum size while moving with respect to the object.

In some examples, the boundary distance is a first boundary distance; and the method further includes, during the further movement of the head-mounted device, decreasing a size of the second user interface element while a second boundary distance decreases, the second boundary distance being a distance of the second user interface element from the boundary associated with the user interface.

In some examples, the decreasing of the size of the first user interface element includes continuously decreasing the size of the first user interface element while the boundary distance is decreasing and is below the threshold distance.

In some examples, the method further includes maintaining a location of the second user interface element with respect to an object that is external to the head-mounted device while decreasing the size of the first user interface element.

In some examples, the method further includes maintaining a fixed gap between the first user interface element and the second user interface element while decreasing the size of the first user interface element.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method, the method comprising:
presenting a first user interface element and a second user interface element within a user interface that is included in a display of a head-mounted device; and
in response to movement of the head-mounted device:
moving the first user interface element and the second user interface element within the display with respect to the user interface while the first user interface element remains stationary with respect to an object that is external to the head-mounted device and a size of the first user interface element decreases; and
maintaining the size of the first user interface element while the first user interface element is stationary with respect to the user interface and moves with respect to the object that is external to the head-mounted device.

2. The method of claim 1, wherein:
the user interface moves, in response to the movement of the head-mounted device, with respect to the object that is external to the head-mounted device; and
the second user interface element remains stationary, in response to the movement of the head-mounted device, with respect to the object that is external to the head-mounted device.

3. The method of claim 1, wherein a size of the second user interface element remains constant while the size of the first user interface element decreases.

4. The method of claim 3, wherein, while the size of the first user interface element is decreasing and the size of the second user interface element is maintained, a boundary distance of the first user interface element from a boundary associated with the user interface is less than a distance of the second user interface element from the boundary associated with the user interface.

5. The method of claim 1, wherein:
the movement of the head-mounted device is rotation of the head-mounted device in a first rotational direction;
the movement of the first user interface element and the second user interface element includes moving the user interface in a first direction within the display with respect to the object that is external to the head-mounted device, the first direction corresponding to the first rotational direction; and
the method further comprises:
in response to rotation of the head-mounted device in a second rotational direction, moving the first user interface element and the second user interface element within the display with respect to the object in a second direction, the second rotational direction being opposite to the first rotational direction and the second direction being opposite to the first direction, the movement of the first user interface element and the second user interface element within the display with respect to the object in the second direction causing a boundary distance to increase, the boundary distance being based on a distance between the first user interface element and a boundary associated with the user interface; and
increasing the size of the first user interface element based on the boundary distance increasing.

6. The method of claim 1, further comprising maintaining a location of the second user interface element with respect to the object that is external to the head-mounted device while decreasing the size of the first user interface element.

7. The method of claim 1, further comprising maintaining a fixed gap between the first user interface element and the second user interface element while decreasing the size of the first user interface element.

8. The method of claim 1, wherein the size of the first user interface element decreases based on a boundary distance between an upper threshold distance and a lower threshold distance while the boundary distance is decreasing, the boundary distance being based on a distance between the first user interface element and a boundary associated with the user interface.

9. The method of claim 1, wherein the size of the first user interface element is maintained and the first user interface element is stationary with respect to the user interface based on a boundary distance reaching a lower threshold distance, the boundary distance being based on a distance between the first user interface element and a boundary associated with the user interface.

10. A non-transitory computer-readable storage medium comprising instructions stored thereon that, when executed by at least one processor, are configured to cause a head-mounted computing device to perform:
presenting a first user interface element and a second user interface element within a user interface that is included in a display of the head-mounted computing device;
in response to first movement of the head-mounted computing device, moving the first user interface element and the second user interface element within the display while the first user interface element remains stationary with respect to an object that is external to the head-mounted computing device, the first movement of the first user interface element decreasing a boundary distance below an upper threshold distance and being at least a lower threshold distance, the boundary distance being based on a distance between the first user interface element and a boundary associated with the user interface;
decreasing a size of the first user interface element while the boundary distance is decreasing and is below the upper threshold distance and is at least the lower threshold distance; and
in response to second movement of the head-mounted computing device in a same direction as the first movement of the head-mounted computing device after the boundary distance has reached the lower threshold distance, maintaining the size of the first user interface element while the first user interface element is stationary with respect to the user interface and moves with respect to the object that is external to the head-mounted computing device.

11. The non-transitory computer-readable storage medium of claim 10, wherein the instructions are further configured to cause the head-mounted computing device to maintain the boundary distance at the lower threshold distance after the size of the first user interface element has been decreased to a minimum user interface element size.

12. The non-transitory computer-readable storage medium of claim 10, wherein:
the movement of the first user interface element and the second user interface element within the display is a first movement of the first user interface element and the second user interface element within the display;
the instructions are further configured to cause the head-mounted computing device to, in response to a third movement of the head-mounted computing device, cause movement of the first user interface element and the second user interface element within the display that increases the boundary distance, the third movement of the head-mounted computing device being opposite to the first movement of the head-mounted computing device; and
the instructions are further configured to cause the head-mounted computing device to increase the size of the first user interface element while the boundary distance is increasing and is below the upper threshold distance.

13. The non-transitory computer-readable storage medium of claim 12, further comprising:
maintaining the size of the first user interface element at a maximum user interface element size after the boundary distance exceeds the upper threshold distance, the maximum user interface element size being a size of the first user interface element before the boundary distance was below the upper threshold distance.

14. The non-transitory computer-readable storage medium of claim 13, wherein:
the boundary associated with the user interface is a first boundary associated with the user interface;
the boundary distance is a first boundary distance;
the movement of the first user interface element and the second user interface element within the display that increases the first boundary distance also decreases a second boundary distance below the upper threshold distance, the second boundary distance being based on a distance between the second user interface element and a second boundary associated with the user interface; and
the instructions are further configured to cause the head-mounted computing device to decrease a size of the second user interface element while the second boundary distance is decreasing and is below the upper threshold distance.

15. The non-transitory computer-readable storage medium of claim 10, wherein:
the boundary distance is a first boundary distance; and
the instructions are further configured to cause the head-mounted computing device to, during further movement of the head-mounted computing device, decrease a size of the second user interface element while a second boundary distance decreases, the second boundary distance being a distance of the second user interface element from the boundary associated with the user interface.

16. The non-transitory computer-readable storage medium of claim 10, wherein the decreasing of the size of the first user interface element includes continuously decreasing the size of the first user interface element while the boundary distance is decreasing and is below the upper threshold distance.

17. A head-mounted computing device comprising:
a display;
at least one processor; and
a non-transitory computer-readable storage medium comprising instructions stored thereon that, when executed by the at least one processor, are configured to cause the head-mounted computing device to perform:
presenting a first user interface element and a second user interface element within a user interface that is included in the display;
in response to first movement of the head-mounted computing device, moving the first user interface element and the second user interface element within the display while the first user interface element remains stationary with respect to an object that is external to the head-mounted computing device, the first movement of the first user interface element decreasing a boundary distance below an upper threshold distance and being at least a lower threshold distance, the boundary distance being based on a distance between the first user interface element and a boundary associated with the user interface;

decreasing a size of the first user interface element while the boundary distance is decreasing and is below the upper threshold distance and is at least the lower threshold distance; and in response to second movement of the head-mounted computing device in a same direction as the first movement of the head-mounted computing device after the boundary distance has reached the lower threshold distance, maintaining the size of the first user interface element while the first user interface element is stationary with respect to the user interface and moves with respect to the object that is external to the head-mounted computing device.

18. The head-mounted computing device of claim 17, wherein the instructions are further configured to cause the head-mounted computing device to maintain a location of the second user interface element with respect to the object that is external to the head-mounted computing device while decreasing the size of the first user interface element.

\* \* \* \* \*